United States Patent [19]
Kakizawa et al.

[11] Patent Number: 5,237,510
[45] Date of Patent: Aug. 17, 1993

[54] TRANSPORTATION SYSTEM FOR PRODUCTS OPERATED ON BY MANUFACTURING ON TESTING UNITS

[75] Inventors: Sadao Kakizawa, Utsunomiya; Harunobu Tateno, Tochigi; Mineo Gamo, Yuki; Katsuji Kobayashi; Shinsaku Turumoto, both of Oyama, all of Japan

[73] Assignee: Fujitsu Limited, Kawasaki, Japan

[21] Appl. No.: 672,861

[22] Filed: Mar. 20, 1991

[30] Foreign Application Priority Data

Mar. 20, 1990 [JP] Japan ................... 2-068029

[51] Int. Cl.⁵ ............................... G06F 15/46
[52] U.S. Cl. .................... 364/478; 198/341; 198/347.1; 364/468; 414/273
[58] Field of Search ............ 364/478, 468, 474.11; 198/341, 347.1–347.4; 414/273, 277–280, 285, 286

[56] References Cited

U.S. PATENT DOCUMENTS

| | | | |
|---|---|---|---|
| 4,027,246 | 5/1977 | Caccoma et al. | 198/341 X |
| 4,053,741 | 10/1977 | Ainoya et al. | 364/478 |
| 4,719,694 | 1/1988 | Herberich et al. | 198/341 X |
| 4,870,592 | 9/1989 | Lampi et al. | 364/478 X |
| 4,909,697 | 3/1990 | Bernard, II et al. | 198/341 X |

FOREIGN PATENT DOCUMENTS 61-23002  1/1986  Japan.
61-86301  5/1986  Japan.

*Primary Examiner*—Joseph Ruggiero
*Attorney, Agent, or Firm*—Staas & Halsey

[57] ABSTRACT

A system for transporting products, including a circulating type transport unit; and an entry unit for products, a plurality of cells for processing the products, and a discharge unit for the processed products, disposed at predetermined locations, the entry unit including a first-in-first-out type first storage and random access type second storage, the second storage temporarily storing products which have to wait for processing by a cell due to that cell's being busy.

21 Claims, 40 Drawing Sheets

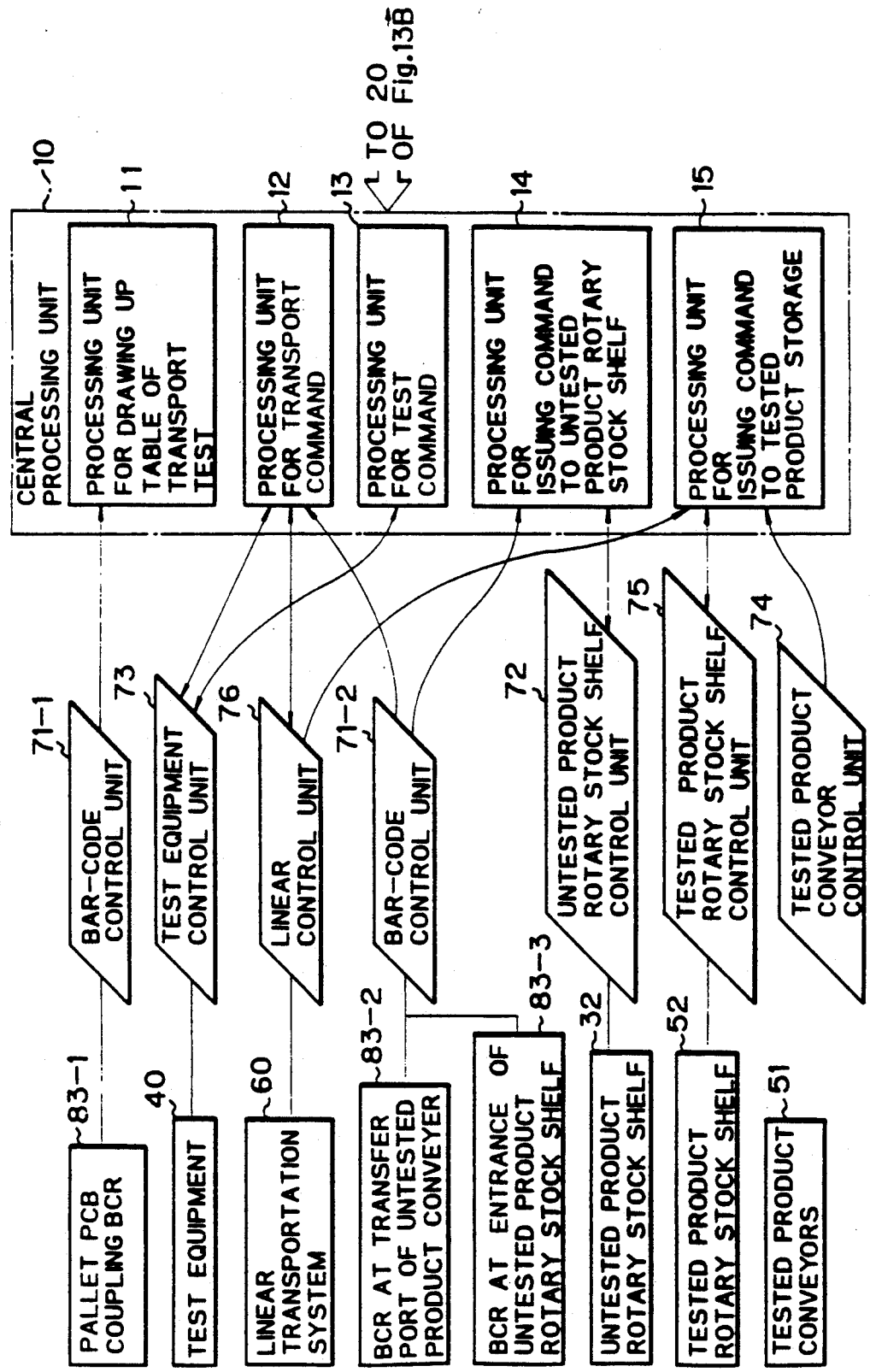

Fig. 13B

```
                          ┌─────────────────────────────────┐ 20
                          │ ┌─────────────────────────────┐ │
                          │ │ TABLE OF PROCESSES FOR      │─┼─91
                          │ │ PCB                         │ │
                          │ └─────────────────────────────┘ │
                          │ ┌─────────────────────────────┐ │
                          │ │ TP TABLE FOR PCB TEST       │─┼─92
                          │ │ EQUIPMENT                   │ │
                          │ └─────────────────────────────┘ │
                          │ ┌─────────────────────────────┐ │
                          │ │ TRANSPORT TEST TABLE        │─┼─93
                          │ └─────────────────────────────┘ │
                          │ ┌─────────────────────────────┐ │
                          │ │ MANAGEMENT TABLE OF UNTESTED│─┼─94
                          │ │ PRODUCT ROTARY STOCK SHELF  │ │
                          │ └─────────────────────────────┘ │
   TO 20 OF  ─┐   ┌──────▶│ ┌─────────────────────────────┐ │
   Fig. 13A   ┘               MANAGEMENT TABLE OF UNTESTED │─┼─95
                          │ │ PRODUCT CONVEYOR            │ │
                          │ └─────────────────────────────┘ │
                          │ ┌─────────────────────────────┐ │
                          │ │ MANAGEMENT TABLE OF TESTED  │─┼─96
                          │ │ PRODUCT ROTARY STOCK SHELF  │ │
                          │ └─────────────────────────────┘ │
                          │ ┌─────────────────────────────┐ │
                          │ │ STATION ADDRESS CONVERSION  │ │
                          │ │ TABLE                       │ │
                          │ └─────────────────────────────┘ │
                          │ ┌─────────────────────────────┐ │
                          │ │ TABLE OF NóS OF CARRIER CARS│─┼─97
                          │ │ CARRYING MIGRATORY PRODUCTS │ │
                          │ └─────────────────────────────┘ │
                          │ ┌─────────────────────────────┐ │
                          │ │ TABLE OF DATA INDICATING TRANSPORT│─98
                          │ │ STANDBY                     │ │
                          │ └─────────────────────────────┘ │
                          │ ┌─────────────────────────────┐ │
                          │ │ TABLE INDICATING STANDBY FOR│─┼─99
                          │ │ REQUESTED TEST EQUIPMENT    │ │
                          │ └─────────────────────────────┘ │
                          └─────────────────────────────────┘
                                         21
```

Fig. 14A

| PRODUCT NAME | TEST EQUIPMENT No. 91 | | |
|---|---|---|---|
| OF PCB (ZUBAN 1) | (A) | (B) | (F) |

```
PCB         TEST                        TP         PRIORITY
NAME    EQUIPMENT No.  TPNo.   NAME       FLAG
ZUBAN 1 ——— A ——┬— 1 — TP1 —  "0"    "0" INVALID
                └— 2 — TP2 —  "1"    "1" VALID
```

Fig. 14C

| PCB·ID (PCB NAME + MANUFACTURING NO.) | TEST PROCESS 93 | | | | |
|---|---|---|---|---|---|
| | TEST EQUIPMENT NO. | | TEST EQUIPMENT NO. | | ---- |
| | TP No. | COMPLETION FLAG | TP No. | COMPLETION FLAG | ---- |

ZUBAN 1·00001 — A10 — B20 — -----

COMPLETION FLAG
"0" NOT COMPLETE
"1" COMPLETE

Fig. 14D

MANAGEMENT TABLE
OF EMPTY SHELF

| SHELF ADDRESS | STATUS IN USE |
|---|---|
| TANA 1 | EMPTY |
| TANA 2 | FULL |
|  |  |

STOCK TABLE 94

| PCB·ID | SHELF ADDRESS | IN USE TEST EQUIPMENT No. OF ||||
|---|---|---|---|---|---|
| ZUBAN 1·00001 | TANA 2 | A | B | F | ------ |

| CONVEYOR No. | PCB·ID | IN USE TEST EQUIPMENT No. OF ||||
|---|---|---|---|---|---|
| 1 | ZUBAN 3·00001 | D | E | F | ------ |
| 2 | ZUBAN 4·00001 | A | C | E | ------ |
| 3 | — | — | — | — |  |
| 4 | ZUBAN 5·00001 | H | I | — |  |

Fig. 14F

MANAGEMENT TABLE
OF EMPTY SHELF

| SHELF ADDRESS | STATUS IN USE |
|---|---|
| TANA 1 | EMPTY |
| TANA 2 | FULL |
| | |

96

STOCK TABLE

| PCB·ID | SHELF ADDRESS |
|---|---|
| ZUBAN 9·00001 | TANA 2 |

| CARRIER CAR No. | LOAD FLAG |
|---|---|
| CAR 1 | "1" |

"1" LOADED PRODUCT (MIGRATORY PRODUCT) EXISTS

| ENTERED PRODUCT PCB·ID | TRANSPORTATION PATTERN | | | DISCHARGE FLAG OF MIGRATORY PRODUCT | PRODUCT LOADED FROM ROTARY STOCK SHELF | STOCK DIS-CHARGE FLAG | DISCHARGE PRODUCT PCB·ID |
|---|---|---|---|---|---|---|---|
| | From | To | To | | | | |
| 91 — ZUBAN1·00101 | UNTESTED PRODUCT CONVEYOR 1 | A | TESTED PRODUCT CONVEYER 1 | "0" | — | — | ZUBAN1·00100 |
| 92 — ZUBAN2·00102 | UNTESTED PRODUCT ROTARY STOCK SHELF | B | — | "1" | "1" | "0" | ZUBAN2·00100 |
| 93 — ZUBAN3·00101 | UNTESTED PRODUCT ROTARY STOCK SHELF | C | — | "1" | "1" | "1" | ZUBAN3·00100 |
| 94 — ZUBAN4·00102 | UNTESTED PRODUCT CONVEYOR 3 | D | — | "1" | — | — | ZUBAN4·00101 |
| 95 — ZUBAN5·00102 | UNTESTED PRODUCT CONVEYOR 2 | E | — | "0" | — | — | — |
| --- | --- | --- | --- | --- | --- | --- | --- |

Fig. 141

| TEST EQUIPMENT No. | UNTESTED PRODUCT REQUEST FLAG | PCB ID OF DISCHARGED PRODUCT IF ANY |
|---|---|---|
| A | "1" | ZUBANα·NNNNN |
| B | "0" | — |
| C | "1" | — |
| ⋮ | ⋮ | ⋮ |

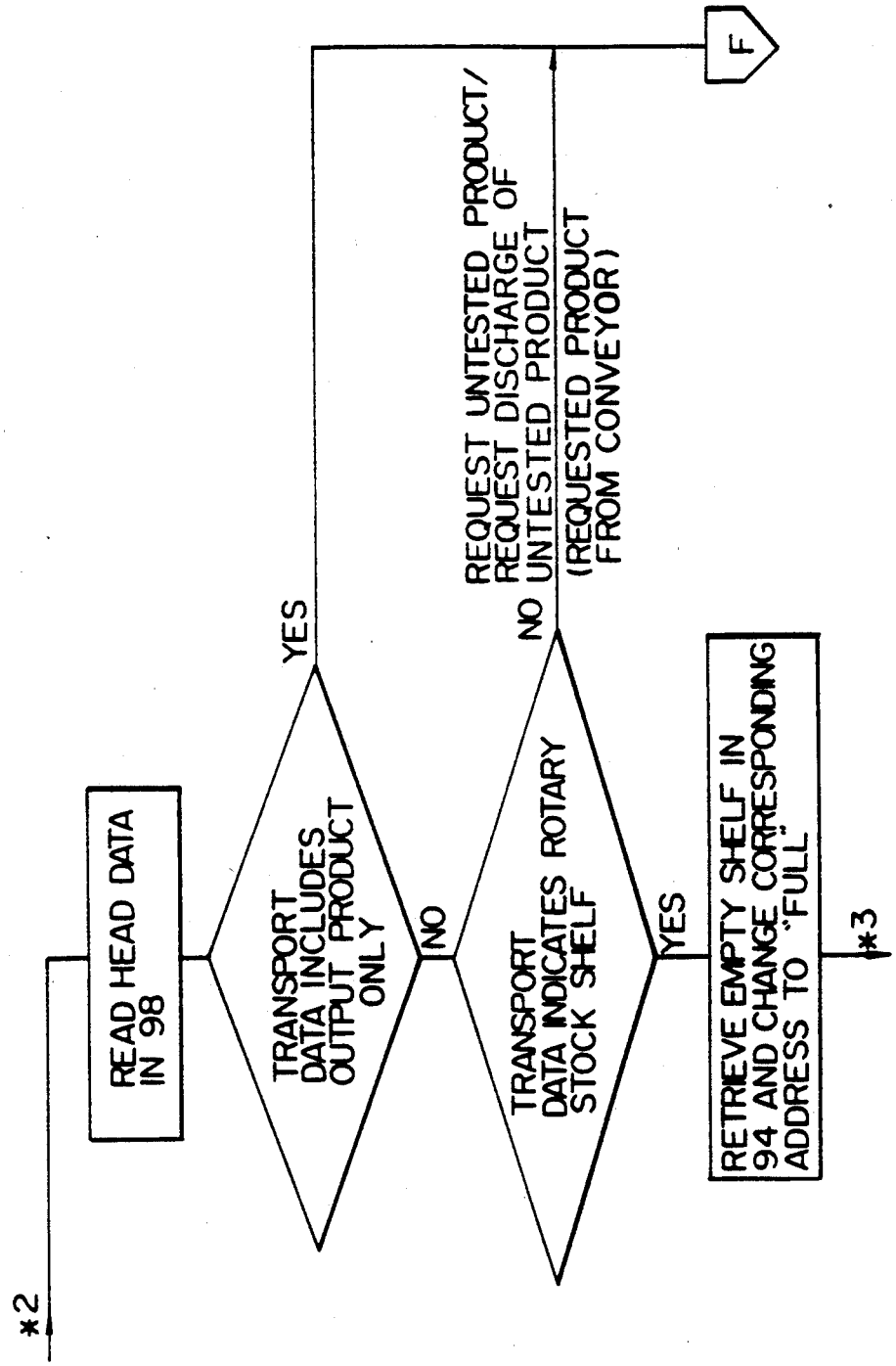

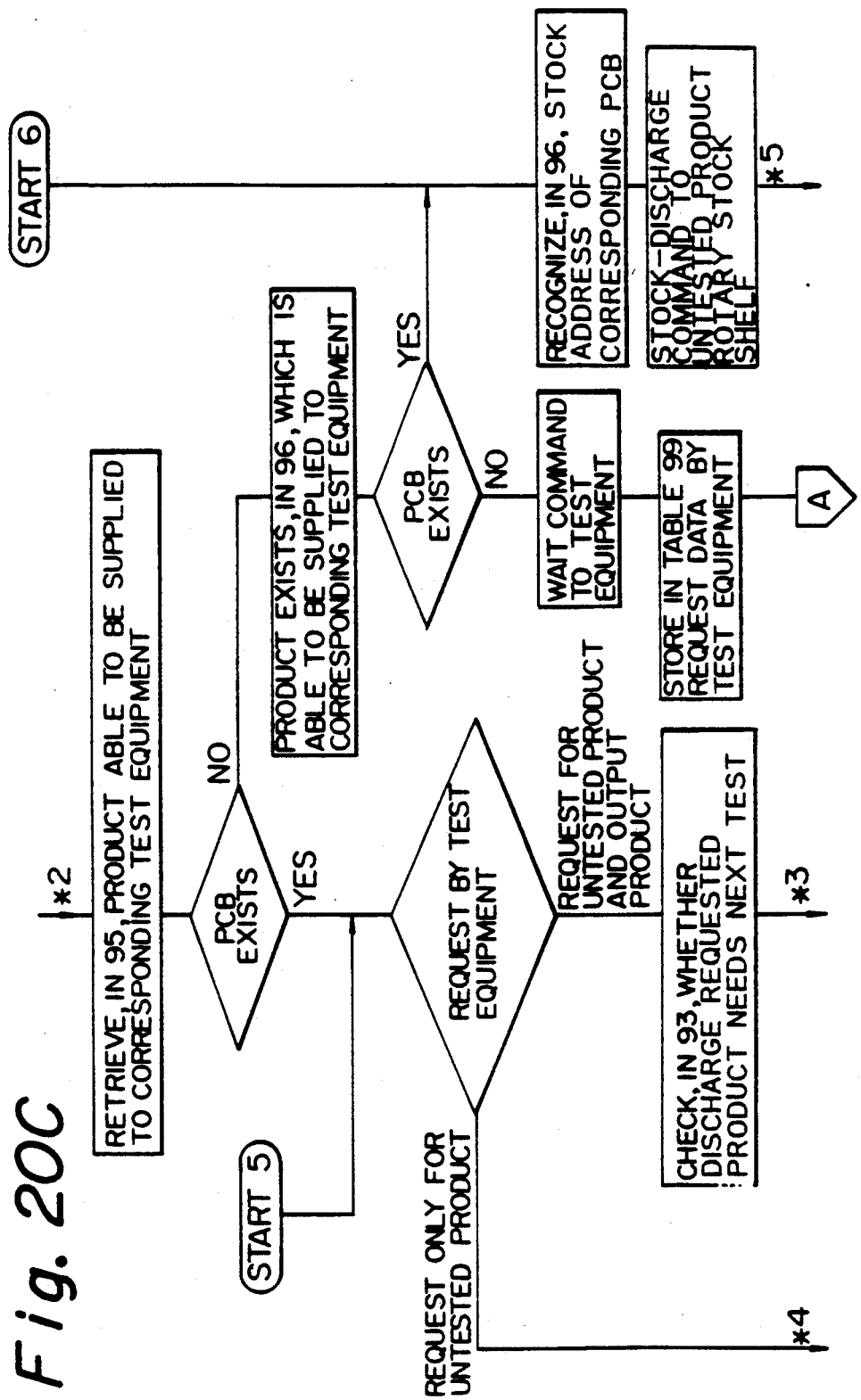

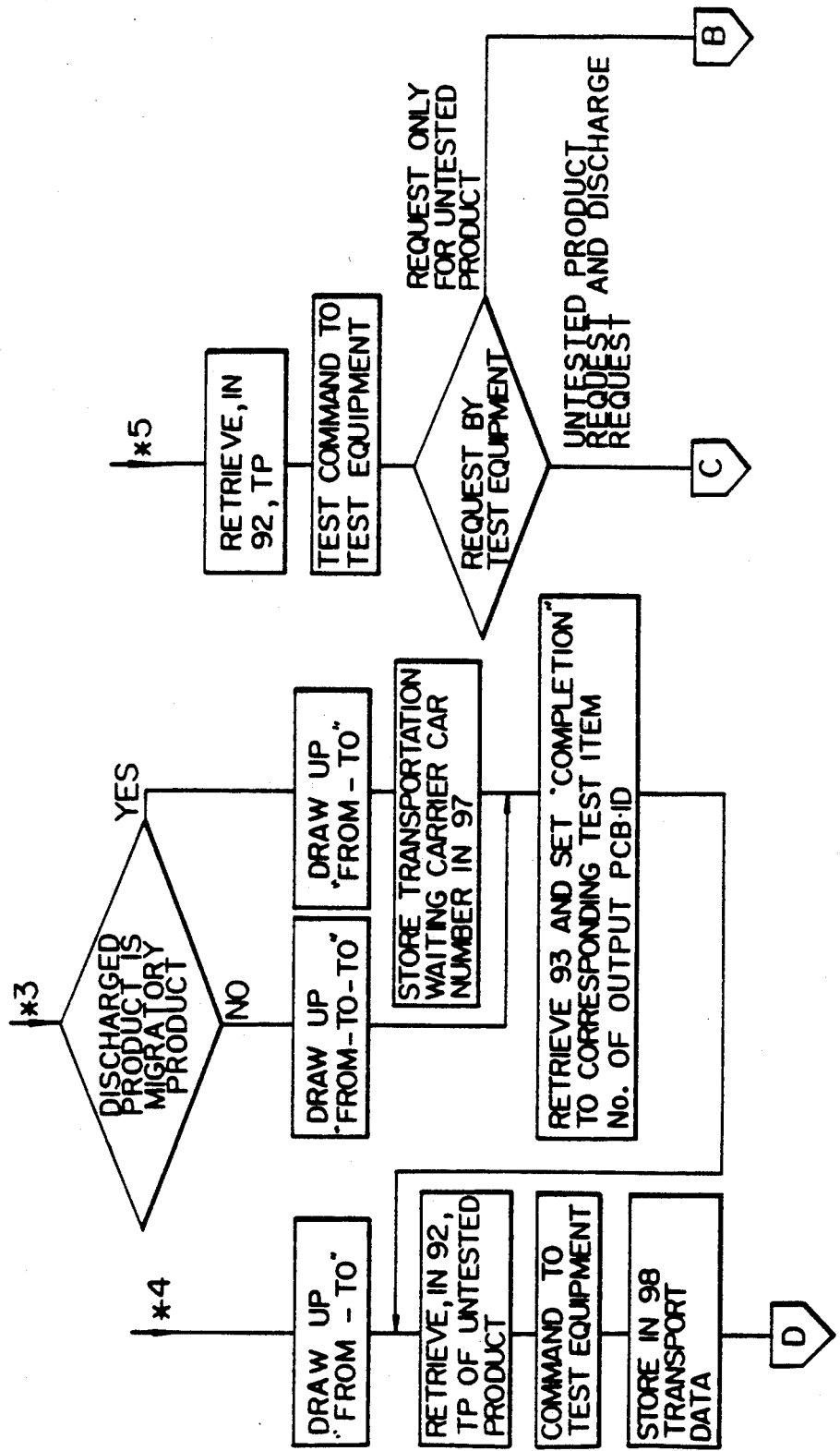

TRANSPORTATION SYSTEM FOR PRODUCTS OPERATED ON BY MANUFACTURING ON TESTING UNITS

BACKGROUND OF THE INVENTION

1. Field of the Invention

The present invention relates to a transportation system and, more particularly, to a transportation system including an entry unit for a plurality of products, a plurality of cells for performing processing of the entered products, a discharge unit for discharging the products which the predetermined cells have finished processing, and a transport unit for moving the products through the entry unit, cells, and discharge unit, all controlled by a central processing unit (CPU) cooperating with a main memory.

The above transportation system can be used in various fields, for example, equipment for manufacturing and testing printed circuit boards (PCB's). The manufacture and testing of such products (PCB's) require much human labor and demands for automation (unmanned operation) have been rising.

2. Description of the Related Art

There are two leading types of conventional transportation systems:

1) Transportation systems using conveyors
2) Transportation systems using self-propelled carts In type 1), products are placed on a conveyor and moved in a single direction, during which they are subjected to various types of processing (manufacture and testing).

In type 2), products are placed on self-propelled carts which can move two-dimensionally and are moved to various processing locations.

In the transportation system of type 1) using conveyors), there is the problem that products entered from the entry unit simply move toward the discharge unit in the order of their entry and that flexible processing (manufacture and testing) in accordance with the type of the product is difficult.

In the transportation system of type 2) (using self-propelled carts), when the products involved are of diverse types for short run production, there is a problem that the flow of products becomes complex and control of the transport becomes extremely complicated. Considering these problems in slightly more detail, in the transport of products using self-propelled carts, to raise the efficiency of transport, the practice has been to keep the products in racks or containers specifically designed for the various products and then move them for the predetermined processing. When doing this, in managing the transport of products, it is necessary to manage the large number of racks and containers prepared for the different products produced in small lots, making matters considerably complex. Further, the frequency of transport inevitably increases, so management becomes considerably complicated. Also, as products are processed, defective ones are removed, so the amount of products in the racks or containers gradually change. On-line management of the status of these, therefore, is required at all times.

SUMMARY OF THE INVENTION

Therefore, the present invention, in view of the above problem, has as its object the provision of a transportation system which can flexibly handle different types of products and which can smoothly perform processing on the products and therefore enable the system to be efficiently operated.

To attain the above object, the present invention is provided with a transport unit of a circulating types, an entry unit of products, a plurality of cells for processing the products, and a discharge unit for discharging the processed products disposed at predetermined locations along the transport unit. Further, the entry unit includes a sequential, or first-in-first-out (FIFO) type first storage means and a random access type second storage means. The second storage means temporarily stores products which must wait for processing by cells which are busy.

BRIEF DESCRIPTION OF THE DRAWINGS

The above object and features of the present invention will be more apparent from the following description of the preferred embodiments with reference to the accompanying drawings, wherein:

FIG. 13A and FIG. 13B are views showing the detailed constitution of a central processing system;

FIG. 14A is a view showing details of a table 91 in FIG. 13B; ;

FIG. 14B is a view showing details of a table 92 in FIG. 13B;

FIG. 14C is a view showing details of a table 93 in FIG. 13B;

FIG. 14D is a view showing details of a table 94 in FIG. 13B;

FIG. 14E is a view showing details of a table 95 in FIG. 13B;

FIG. 14F is a view showing details of a table 96 in FIG. 13B;

FIG. 14G is a view showing details of a table 97 in FIG. 13B;

FIG. 14H is a view showing details of a table 98 in FIG. 13B;

FIG. 14I is a view showing details of a table 99 in FIG. 13B;

FIG. 19A, FIG. 19B, FIG. 19C, FIG. 19D, FIG. 19E, and FIG. 19F are flow charts showing the control of transport and testing (standby transport);

DESCRIPTION OF THE PREFERRED EMBODIMENTS

The embodiments of the present invention will be described next with reference to the related figures.

Figure 1:
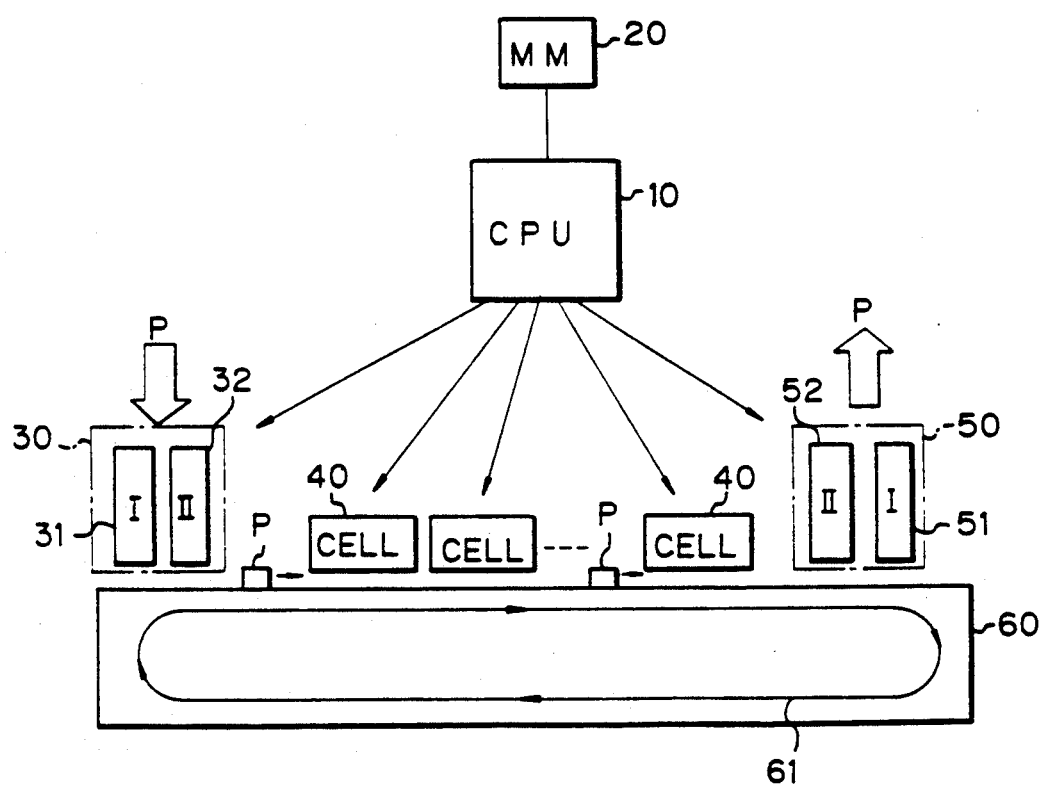
FIG. 1 is a view of the principle of the transportation system according to the present invention.

FIG. 1 is a view illustrating the principle of the transportation system according to the present invention. The figure shows an entry unit 30 for a plurality of products P, a plurality of cells 40 for performing processing of the entered products P, a discharge unit 50 for discharging the products P which the predetermined cells 40 have finished processing, a circulating type transport unit 60 for moving the products P through the entry unit 30, cells 40, and discharge unit 50, etc., all controlled by a CPU 10 cooperating with a main memory 20. Note that the above cells are cells for processing the products P and specifically may be machines for performing work on the products or equipment for testing the products.

More specifically, the entry unit 30 includes an FIFO type first storage 31 which receives the products P from outside independently in units for processing (manufacture and testing) and receives mainly products P of limited types for mass production and a random access type second storage 32 which temporarily stores products which must wait for processing by a cell 40 which is busy. The second storage 32 receives mainly products P of diverse types for short run production.

The transport unit 60 includes a circulating type transport line 61 which returns the semifinished products P which the cells 40 have not yet finished processing to the second storage 32.

The CPU 10 commands the first or second storage 31 or 32 to supply products to any cell 40 whenever there is a request for supply of products from that cell.

Figure 2:
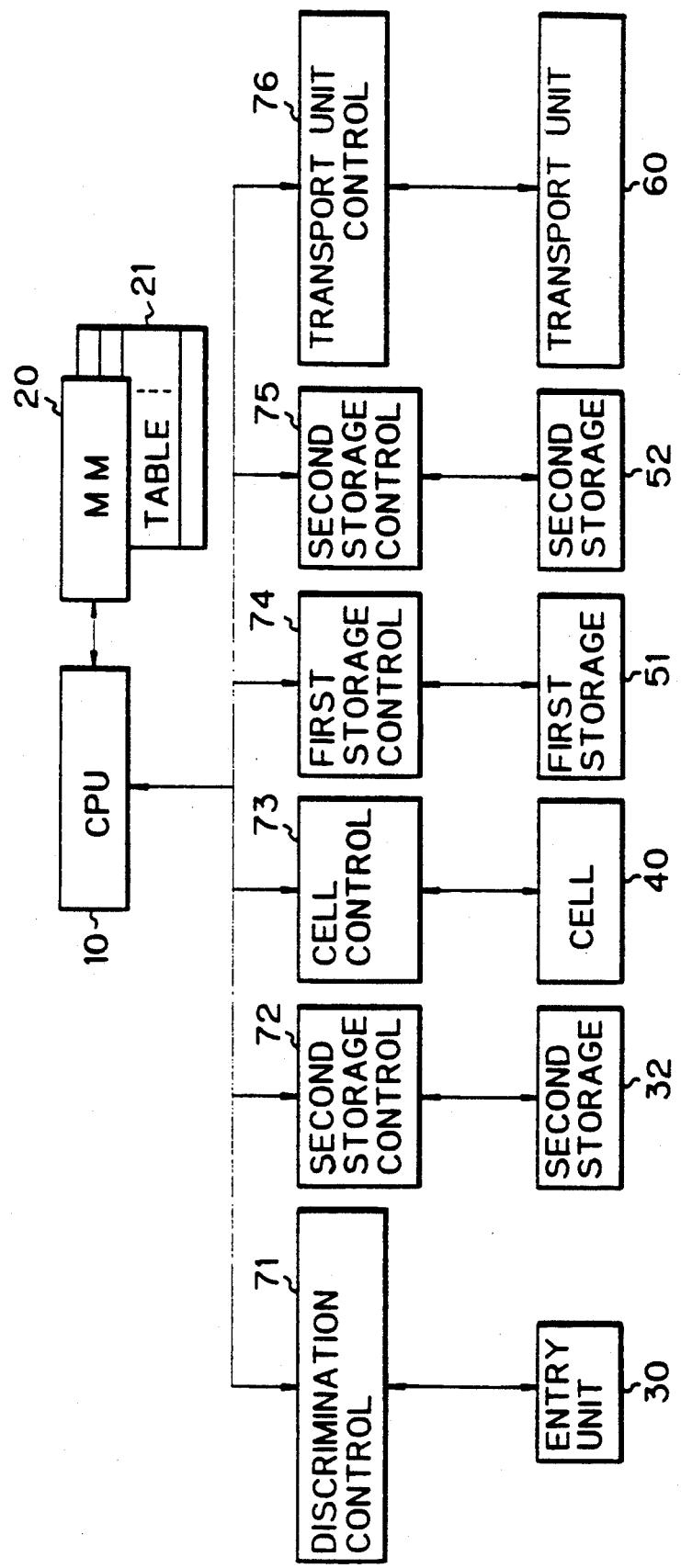
FIG. 2 is a view of the principle of a control system of the transportation system according to the present invention.

FIG. 2 is a view of the principle of a control system of the transportation system according to the present invention.

The CPU 10 has under its control a discrimination control unit 71 for individually discriminating (by bar codes etc.) the products P which are received at the entry unit 30; an entry side second storage control unit 72 which controls the entry and discharge of products P from the second storage 32; a cell control unit 73 which controls the cells 40; a discharge side first storage control unit 74 which controls the FIFO type first storage 51 forming the discharge unit 50; a discharge side second storage control unit 75 which controls the random access type second storage 52 forming the discharge unit 50; and a transport unit control unit 76 which controls the transport unit 60.

Figure 3:
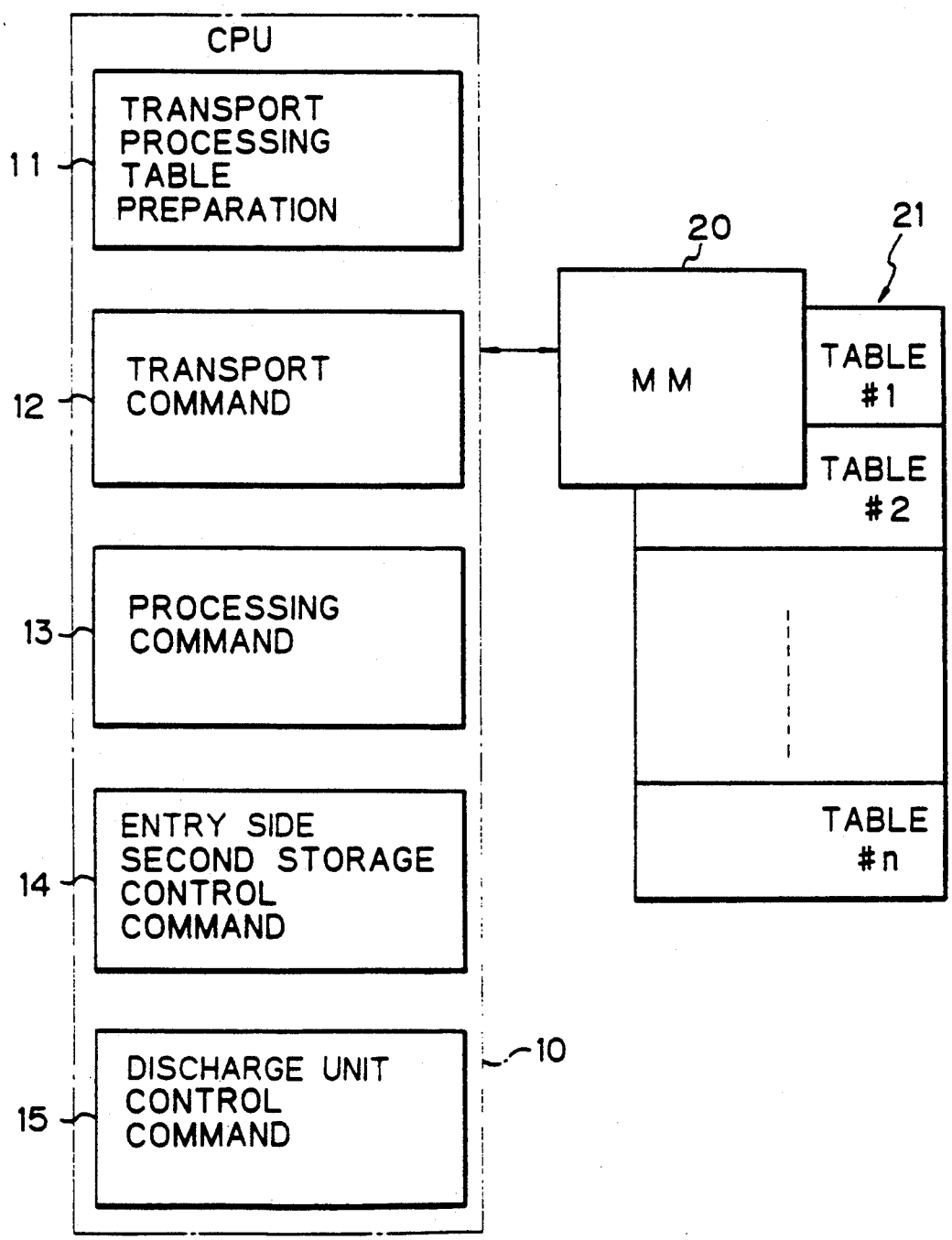
FIG. 3 is a view of the principle of a central processing system of the transportation system according to the present invention.

FIG. 3 is a view illustrating the principle of a central processing system of the transportation system according to the present invention.

The CPU 10 includes a transport and processing table preparation processing unit 11 which transfers control information with the control units under the CPU's control (71 to 76), a transport command processing unit 12, a processing command processing unit 13, an entry side second storage control command processing unit 14, and a discharge unit control command processing unit 15.

The main memory (MM) 20 is provided with a group of tables 21 which successively update and manage the status information of products P at the entry unit 30, cells 40, discharge unit 50, and transport unit 60. The CPU 10 controls the transport of the products P while referring to the various tables.

The characteristic operation of the present invention will be explained next below.

(i) The FIFO type first storage 31 is allocated for products P of limited types for mass production, while the random access type second storage 32 is allocated for products P of diverse types for short run production, thus enabling efficient entry of the products. The second storage 32 temporarily stores the products P which must await processing by a cell due to the cell being busy. The above-mentioned FIFO type specifically refers to a belt conveyor which transports products in a single direction. The above-mentioned random access type refers to a type which can enter products into stock or discharge them from stock at any time and specifically refers to a rotary stock shelf unit comprised of product storing shelves which can turn.

(ii) Using the circulating type transport line 61, semifinished products can be returned once again to any desired cell. Therefore, when requiring processing at two locations such as a first cell 40 and a second cell 40 and when processing at the first cell 40 has been completed, but the second cell 40 is busy processing another product, the semifinished product P does not have to wait there until the second cell 40 becomes vacant, but can be returned to its original position (home position, for example, near entry unit 30 of FIG. 1) and wait for the next opportunity there. Preferably, it is stored once at the second storage 32 of the entry unit 30. By doing this, there is no disturbance of the flow of the plurality of carrier cars (for example, transfer machines with linear motors) running on the transport line 61. Note that the products can be placed on the carrier cars after being provisionally affixed to standardized, fixed size transport pallets (with bar codes) regardless of the size of the products.

(iii) Products P are not pushed out in a so-called "tumble system" from the entry unit 30, but are instead transported in a timely fashion each time there is a request for supply of products from the cells 40. This ie effective for smoothing the processing.

Figure 4:
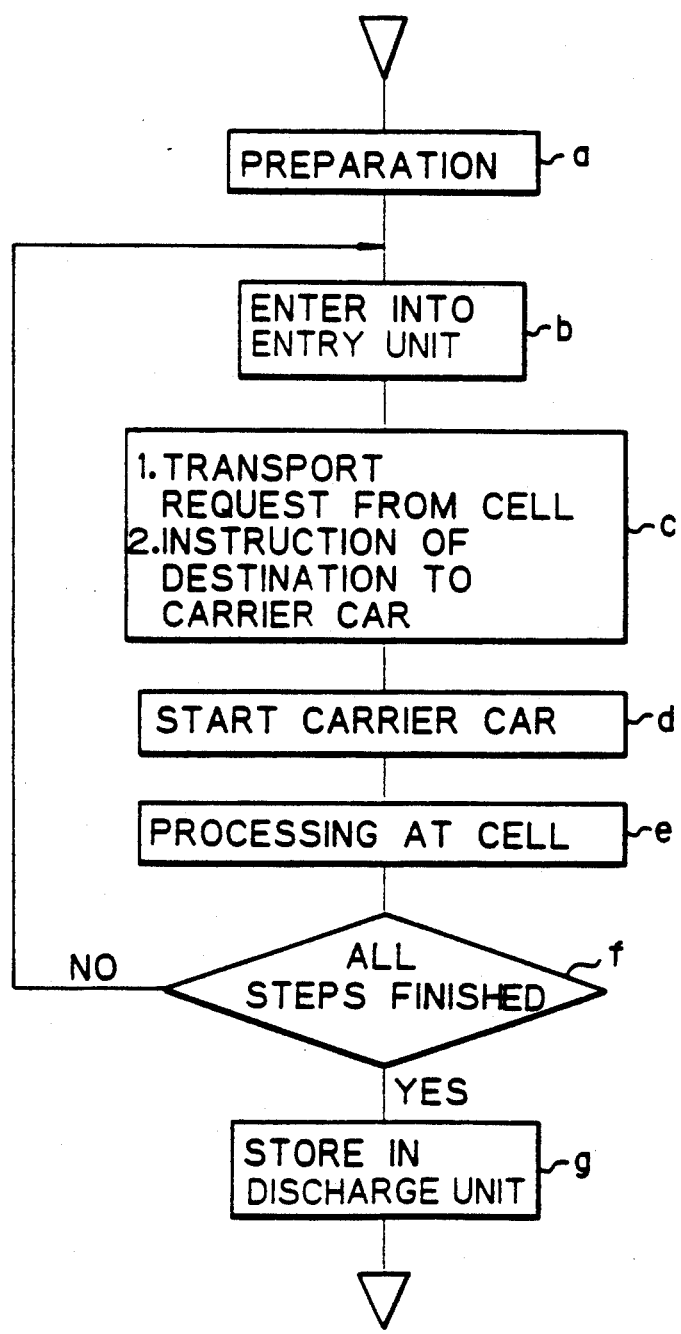
FIG. 4 is a flow chart showing a summary of the transport routine according to the present invention.

FIG. 4 is a flow chart showing a summary of the transport routine according to the present invention.

At step a, the discrimination numbers (bar codes) of the product P and the above-mentioned transport pallet are read, correspondence between the two established, and the correspondence held in the group of tables 21 of the main memory 20.

At step b, the products are allocated to the first or second storage and entered there.

At step c, requests from the cell 40 are awaited and, each time there is a request, the destination is commanded to the above carrier car.

At step d, the carrier car starts running. At this time, the carrier car is also discriminated (bar code is read).

At step e, processing is performed on the product P (processing or testing) so long as the cell 40 is not busy.

At step f, once all the processes (all processing steps) are completed, the product enters the discharge unit 50 at step g, then is discharged to the outside.

Figure 5:
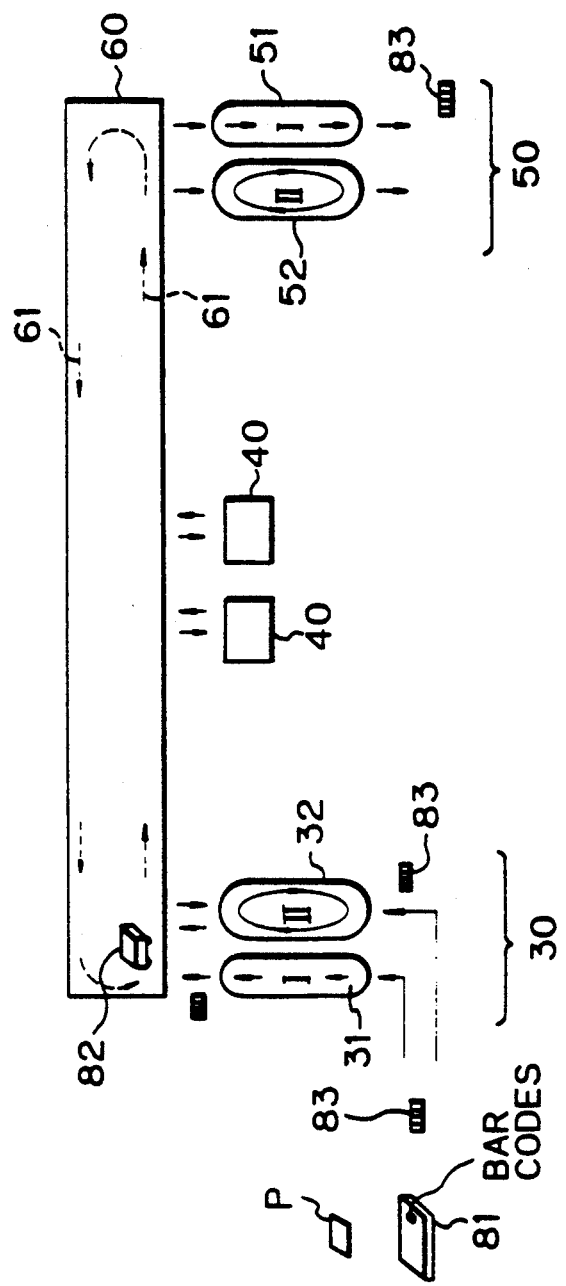
FIG. 5 is a somewhat more detailed view of the transportation system according to the present invention.

FIG. 5 is a somewhat more detailed view of the transportation system according to the present invention. The transport unit 60 is shown upside-down compared with FIG. 1.

In the figure, 81 is a transport pallet of a standardized size used for all products P, 82 is a carrier car which carries the products along with the transport pallets 81, and 83 is a discrimination reader (for example a bar code reader) which reads the discrimination marks placed on the products P, pallets 81, and carrier cars 82. The arrow marks in the figure show the direction of flow of the products P.

Below, an explanation will be made of a detailed embodiment. This embodiment is of a transportation system where the products are PCB's constituting a transmission apparatus, for example, and where these are automatically tested at high speeds and with flexibility. This automatic testing tests the performance of the products (PCB's). Note that while the names of the constituent elements have changed, the same reference numerals or symbols are given to those which are substantially the same or equal to the previously mentioned constituent elements.

In recent years, transmission apparatuses have become more sophisticated in performance and smaller in size due to the diversification of users and the diversification of means of transmission of information. Therefore, the PCB's constituting these apparatuses have become increasingly higher in density and diversified in performance due to the advances made in LSI technology. The importance of PCB tests, which ensure the proper performance of individual PCB's, has been increasing.

The past testing of PCB's was conducted by installing specialized test equipment for the PCB's, but the increasingly sophisticated performance and increasing variety of PCB's has led to an increase in the capital investment required for such test equipment and at the same time resulting in fluctuations in the amounts of products, directly resulting in changes in operating rates of the equipment, thus reducing factory profitability. To deal with this, test equipment (cells) for testing individual functions of the PCB's, rather than specialized test equipment for individual PCB's, are installed so as to allow general use of test equipment and simultaneously eliminate the above problem.

The embodiment is that of a transportation system which sends PCB's among these function test equipment (cells) to enable automatic testing.

When installing a group of test equipment (group of cells 40) and building an automatic testing line, the system may be of the following two types, according to the units of transport:

(1) Systems which transport PCB's which are contained in containers (racks)

(2) Systems which transport individual PCB's

Figure 6:
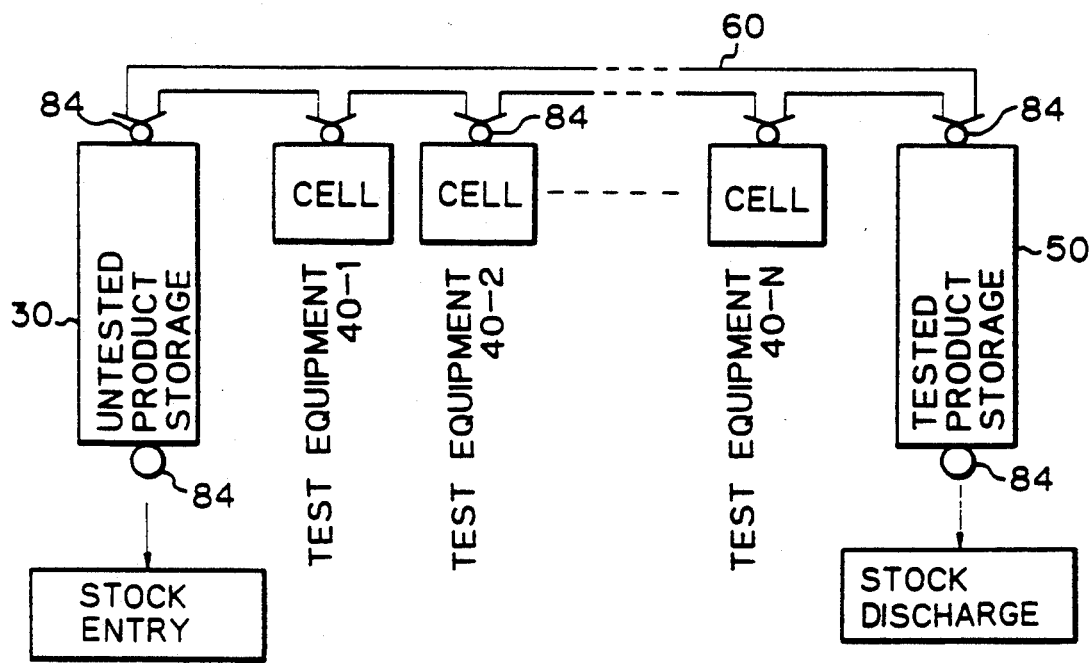
FIG. 6 is a view showing a model of an embodiment of the present invention.

In the case of both the above (1) and (2), the basic line is, as shown in FIG. 6, comprised of an untested product input storage 30 which stores untested products, a group of test equipment 40 which perform the tests for ensuring proper function, a tested product storage 50 which temporarily stores tested products, and a transport unit 60 which transports PCB's among the above three. Reference numeral 84 is a transfer machine which moves products around.

In transport in rack units, when the PCB's pass through the plurality of function test equipment 40 and become tested products, if there is a variation in the tact time (implementation time) of the test equipment, racks will pile up between the test equipment 40 and a standby time where no test products are on hand will arise, making the transportation system inefficient. Further, when products are specially urgent, it is necessary to insert them first into the test equipment 40. Unless the PCB's in the rack are all finished being tested, the urgent products cannot be supplied, which obstructs flexible operation.

The present embodiment is of an automatic testing system using a transportation system which can transport individual PCB's at a high speed and which is flexible and can satisfy the following demands:

a) Restrictive conditions (preconditions)

(1) A high speed transportation apparatus runs in a single direction and can carry only one PCB on a carrier car 82.

(2) Carrier cars 82 which have finished transporting products return by the return route of the transport line 61 and stand by at the carrier car standby station (see FIG. 7) for the next transport command.

(3) Several carrier cars 82 can exist on the transport line 61.

b) Matters to be considered (1) Entry of untested products to the test equipment 40 and discharge of tested products from the test equipment 40 performed by a single linear motor car (carrier car) for efficient transport (2) Introduction of test equipment 40 enabling the above (1) and transfer machines 84 among transport lines 61

(3) Linkage of the test equipment (cell) control apparatuses 73 (FIG. 2) enabling the above (1) and the host computer 10

(4) The following in the case of using a plurality of test equipment 40 for completing the testing of a single PCB:

Method of bridging test equipment 40

Method of control of host computer 10

Hardware construction to be realized (5) Method of use and structure of untested product storage 30 and tested product storage 50

Figure 7:
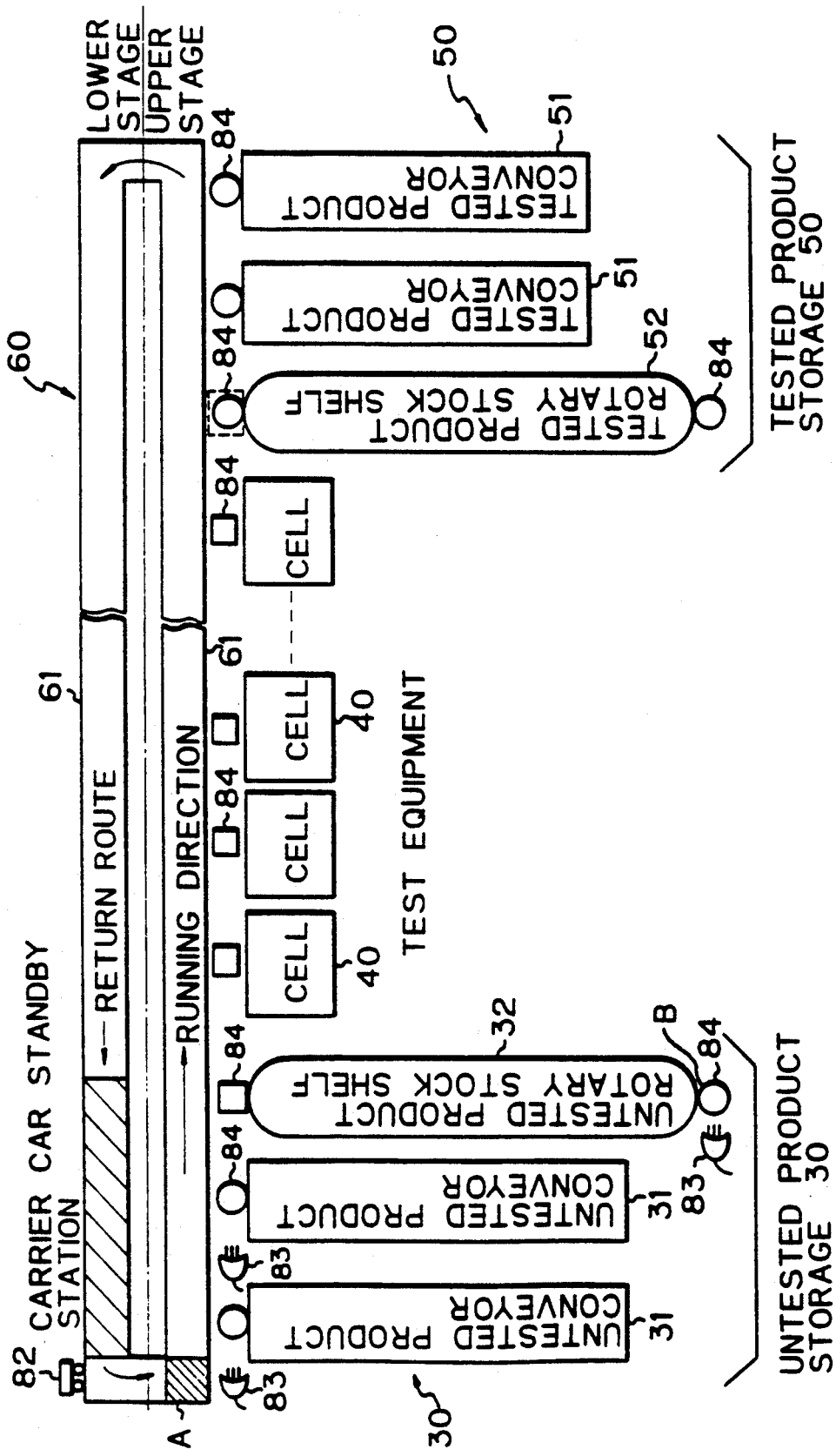
FIG. 7 is a view showing in further detail the embodiment of FIG. 6.

FIG. 7 is a view showing in further detail the embodiment of FIG. 6.

High Speed Transport Unit 60

The high speed transport unit 60 has a two-stage structure of an upper and lower stage, with the upper stage being the transport passage for the PCB's and the lower stage being the return route of the carrier cars 8 which have completed their work. A plurality of carrier cars 82 stand by at the carrier car standby station. When the leading carrier car starts its transport, the succeeding carrier car moves to the position A and stands by for a transport command from the host computer 10. This transport pattern of the carrier cars is performed by the following modes by command from the host computer 10:

① An empty carrier car starts from the position A, receives PCB's from the untested product storage 30 ("from") and carries the untested products to the test equipment 40 ("to"), then carries the products tested at the test equipment 40 and moves them to the tested product storage 50 ("to") in a "From-To-To" pattern.

② The carrier car starts from the position A, receives PCB's from the untested product storage 30 ("from"), and carries them to the test equipment ("to") in a "From-To" pattern.

③ The carrier car starts from the position A, receives tested products from the test equipment 40 ("to"), and moves them to the tested product storage 50 ("to") in a "To-To" pattern.

The above modes ① to ③ are for when there are no products at all on the carrier car 82 at the position A. When the carrier car carrying products between test equipment 40, mentioned later, is at the position A, the following modes are used:

④ The carrier car starts from the position A and moves PCB's carried thereon to the untested product storage (rotary stock shelf unit) 32 ("to") in a "To" pattern.

⑤ The carrier car starts from the position A and moves the already carried products to the untested product rotary stock shelf unit 32 and also carries PCB's discharged from the untested product rotary stock shelf unit 32 in the "From-To-To" pattern and "From-To" pattern. If the input of a single PCB to a plurality of test equipment 40 were done by directly bridging the test equipment 40, since the transport line is one-way and the frequency of transport is high, the carrier cars would occupy the transport line until synchronization were achieved between two pieces of test equipment 40 and the efficiency of the line as a whole would deteriorate. At the same time, the operating rate of the test equipment 40 would decline. Therefore, products going to the next test equipment 40 are kept carried on the carrier cars and the linear return route is used so that when the carrier cars appear at the portion A, the products are transported to the untested product rotary stock shelf unit 32 (above pattern ④) and entered into stock.

Therefore, there are the following modified patterns of ②' and ④':

②' The transport pattern is the same as the above ②, but the operation does not stop at the untested product storage 30 in the same way as the above-mentioned ①.

④' The operation is the same as the above ③, does not stop at the tested product storage 50 ("To" pattern).

Note that the circle mark 84 in the figure shows a one-way type transfer machine and the square mark 84 a two-way transfer machine.

Untested Product Storage 30

The storage 30 is made up of two types of storages, i.e., is comprised of a belt conveyor 31 (first storage means) which stores PCB's in units of racks holding a plurality of the same and a rotary stock shelf unit 32 (second storage means) which contains PCB's in individual board units and manages the addresses of the same.

When a PCB on a transfer machine 84 between the conveyor 31 and the linear transport line 61 is carried by a linear carrier car 82, the next PCB is sent out to the transfer machine 84 from the rack. At this time, the automatic bar code reader 83 reads the discrimination code ID attached to the PCB, that is, the bar code, and sends the same to the host computer 10. In the host computer 10, the number of the test equipment 40 to be transported to is automatically recognized by the ID.

A plurality (in the figure, two) of the above-mentioned conveyors 31 (first storage means) are preferably disposed along the transport line 61. These conveyors 31 respectively store groups of products of the same type. These products are products of limited types for mass production.

On the other hand, in the rotary stock shelf unit 32, PCB's housed in the racks are taken out one by one by the transfer machine 84 from the position B. At this time, the bar code reader (BCR) 83 reads the ID of the PCB's and transmits the same to the host computer 10. The PCB's are entered into stock based on the stock-entry command (address) from the host computer 10.

Group of Test Equipment 40

The controller 73 of the group of test equipment 40 (FIG. 2) is connected on-line with the host computer 10. Three types of requests are made to the host computer 10, that is, Request for untested products Request for discharge of tested products Request for untested products and request for discharge.

A maximum of three PCB's can be held simultaneously by the test equipment 40 and the transfer machine 84, that is, a PCB in testing is held in the test equipment 40 and an untested product and tested PCB on the transfer machine 84, whereby the transport standby time is canceled out.

Tested Product Storage 50

The storage 50, that is, the discharge unit, is made up of a first storage means of an FIFO type and a second storage means of a random access type. Products which the cells have finished processing are selectively discharged from the first or second storage means.

In the storage 50 is a storage in which these tested products on which testing has been completed by all the test equipment the storage 50 is made up, like the untested product storage 30, of a rotary stock shelf unit 52 and a conveyor 51.

PCB's carried by the linear carrier cars are unloaded on the transfer machines 84. In the case of the conveyor 51, they are then housed in empty racks, while in the case of a rotary stock shelf unit 52, they are entered into the rotary stock shelf unit based on a stock-entry command given to the rotary stock shelf unit 52 by the host computer 10 which receives notification of completion of transport from the linear carrier cars and searches for vacant addresses of the rotary stock shelf unit 52.

A plurality of the FIFO type first storage means 51 in the discharge unit 50 are disposed along the transport line 61. These plurality of first storage means 51 house groups of products of the same type. These groups of products are of limited types for mass production and are groups of products which the cells have finished processing.

Products which are entered through the FIFO first storage means 31 in the entry unit 30 are, after the cells 40 finish processing them, discharged through the FIFO type first storage means in the discharge unit 50. Products which are entered through the second storage means 32 in the entry unit 30 are, after the cells finish processing them, discharged through the second storage means in the discharge unit 50.

The second storage means 52 in the discharge unit 50 temporarily stores products which should be stored in the first storage means when the first storage means 51 in the discharge unit is busy, until it is no longer busy. In this case, a two-way transfer machine 84 is provided between the second storage means 52 and the transport line 61.

Figure 8:
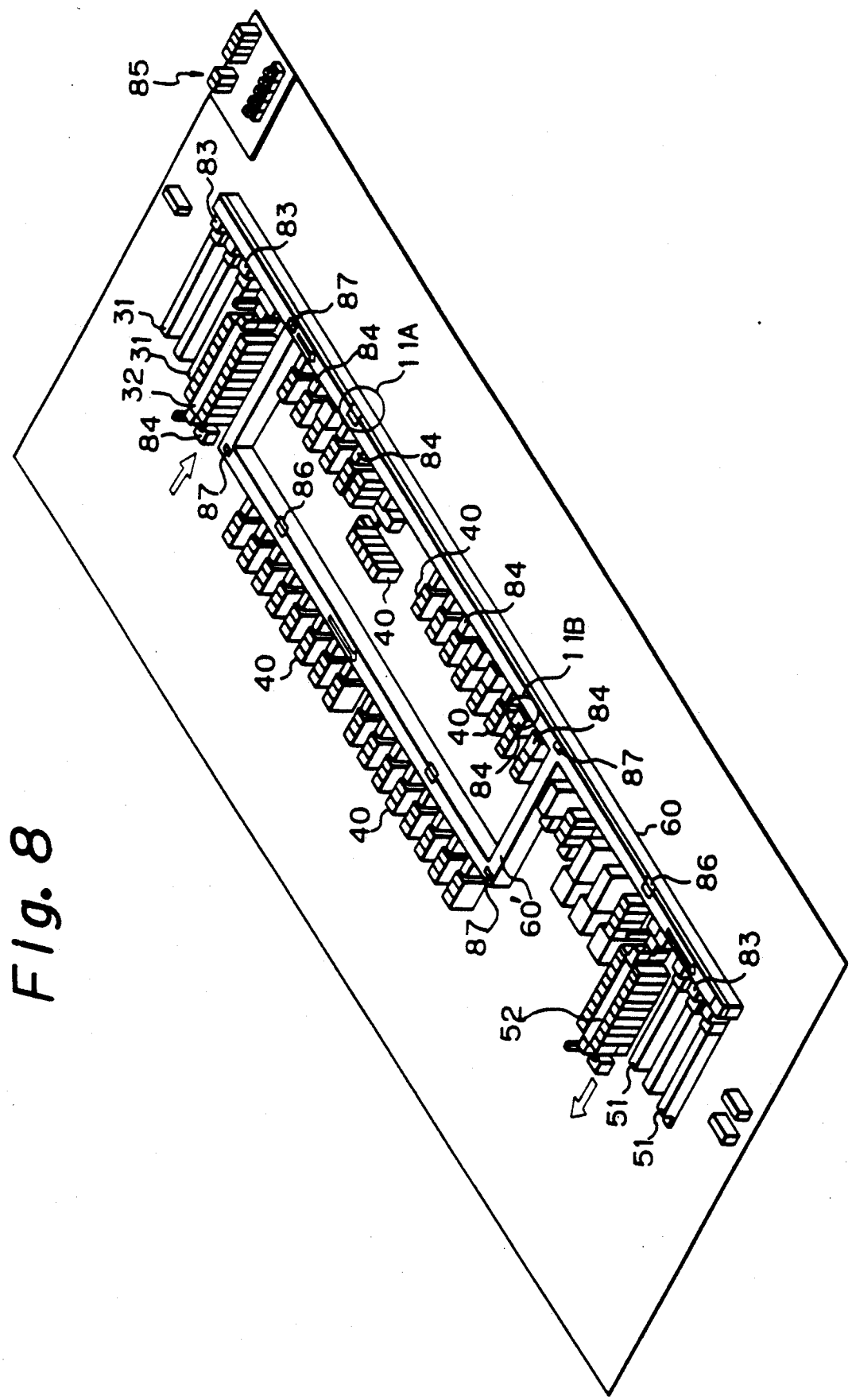
FIG. 8 is a perspective view showing an example of the actual layout of the transportation system according to the present invention.

FIG. 8 is a perspective view showing an example of the actual layout of the transportation system according to the present invention. In the figure, constituent elements corresponding to those in FIG. 7 are given the same reference numerals. Reference numeral 85 is a control center, in which is provided the host computer 10.

In the above explanation, the transport unit 60 was made a single line, but when there are a plurality of cells 40, these cells 40 are disposed separated from each other and parallel connected branching transport units are provided. In FIG. 8, only one branching transport unit 60' is shown.

Figure 9A:
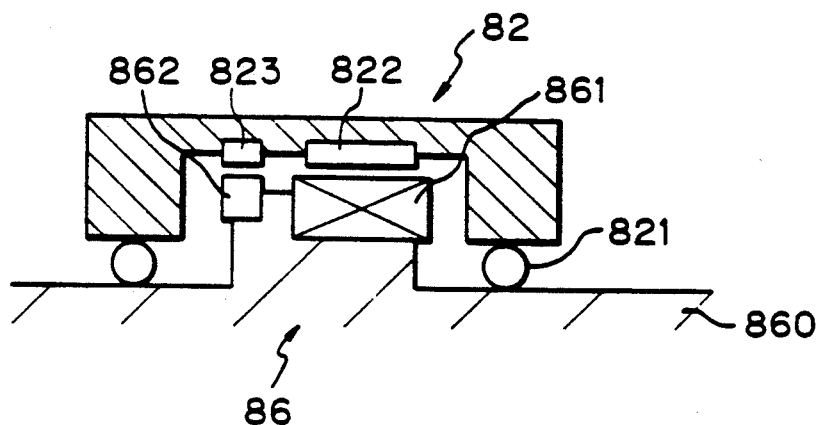
FIG. 9A is a view showing a cross-section of a linear station.

FIG. 9A is a view showing a cross-section of a linear station. The linear station is shown by reference numeral 86 in FIG. 8 and for example is disposed at 2 meter intervals along the transport unit. FIG. 9A shows the linear station in the state where a carrier car 82 is passing through it.

The linear station 86 has a base 860, an electromagnetic coil 861 provided at a portion protruding from the base 860, and a permanent magnet 862.

The carrier car 82 runs in a direction perpendicular to the surface of the paper on casters 821. The driving force for this is obtained by the repulsion force between the electromagnetic coil 861 and an aluminum plate 822. On the other hand, when the electromagnetic coil 861 is deenergized, the speed is reduced and the permanent magnet 862 on the base 860 side and the permanent magnet 823 on the carrier car 82 side attract each other and the car is stopped.

Figure 9B:
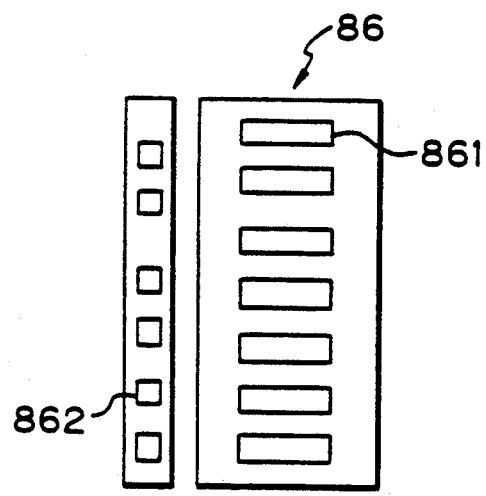
FIG. 9B is a plan view of the linear station.

FIG. 9B is a plan view of the linear station. A plurality of electromagnetic coils 861 (for example, arranged at a pitch of 50 mm) and a plurality of permanent magnets 862 are drawn.

Figure 10:
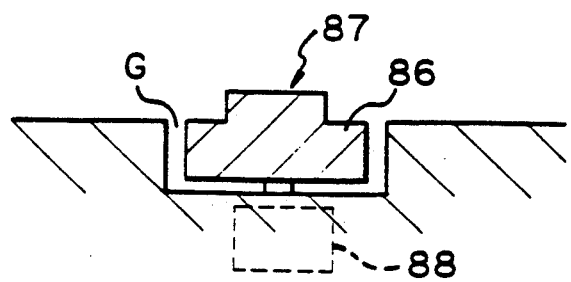
FIG. 10 is a sectional view showing a direction changing means.

FIG. 10 is a sectional view showing a direction changing means. As mentioned earlier, when there are a plurality of cells 40, branching transport units 60' are provided. The linear motor car carrier car 82 can only run in a straight line direction, so a direction changing means is required to guide it from the main line, that is, the transport unit 60, to the branch line, that is transport unit 60'. In FIG. 8, the direction changing means is shown by reference numeral 87 and is provided at a position where the direction of extension of the transport unit changes 90°.

This direction changing means 87 is made up of the linear station 86 shown in FIG. 9A and FIG. 9B. The difference with the other linear stations 86 is that the direction changing linear station 87 can change itself in direction 90°. The power for this change of direction is provided by a hydraulic apparatus 88. The direction changing linear station 87 forms a gap G with the floor around it. This is to prevent bumping into the floor when turning 90°.

Figure 11A:
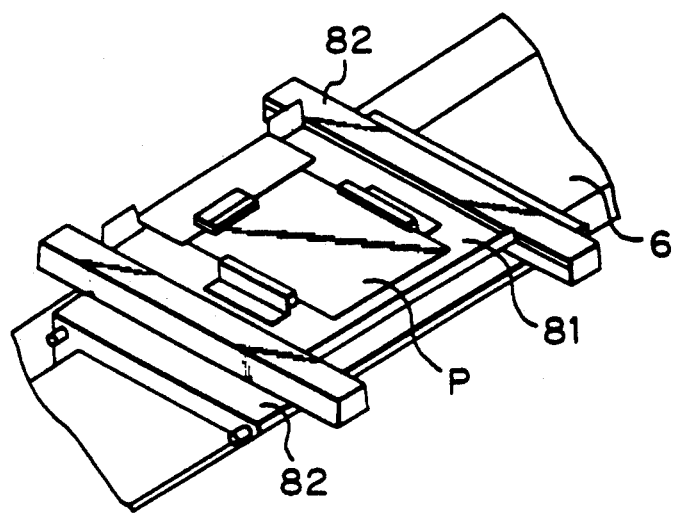
FIG. 11 is a perspective view showing an enlargement of the portion in the circle 11A of FIG. 8.
FIG. 11B is a perspective view showing an enlargement of the portion in the circle 11B of FIG. 8.

FIG. 11A is a perspective view showing an enlargement of the portion in he circle 11A of FIG. 8. The pallet 81 is affixed to part of the carrier car running on the transport line 61, and the product P is gripped by this pallet 81.

Figure 11B:
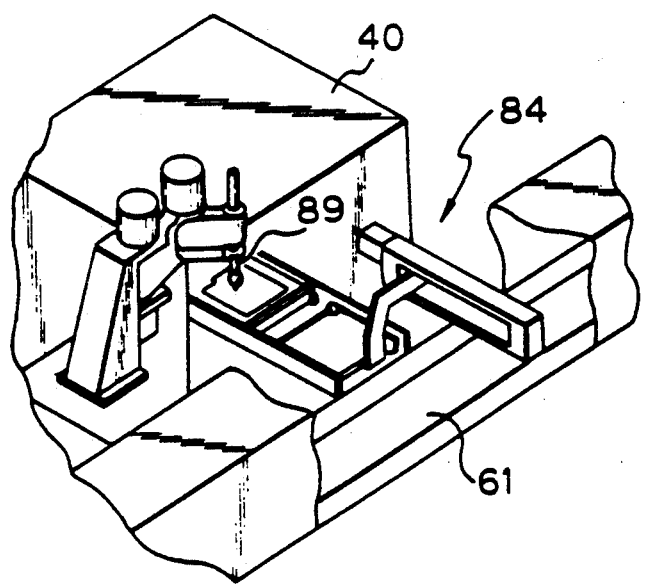

FIG. 11B is a perspective view showing an enlargement of the portion in the circle 11B of FIG. 8. This shows a detailed example of the two-way transfer machine 84. Reference numeral 89 is a driver. A more specific explanation will be given referring to FIG. 12A, FIG. 12B, and FIG. 12C.

Figure 12A:
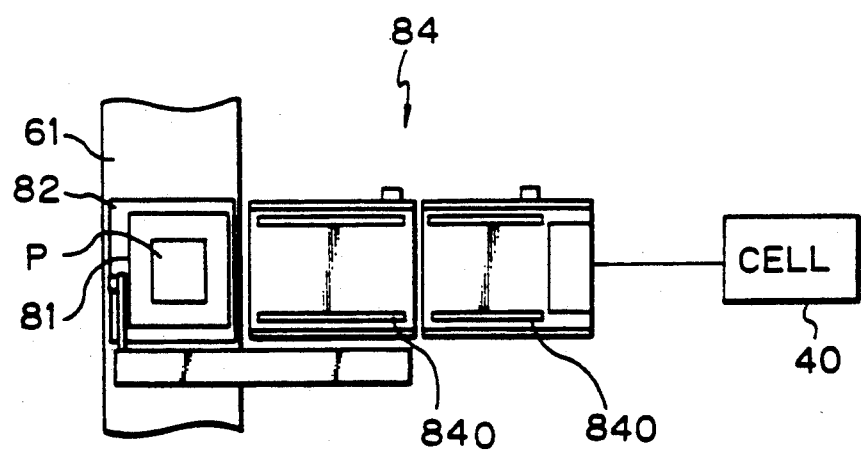
FIG. 12A is a plan view for explaining a transfer machine.
Figure 12B:
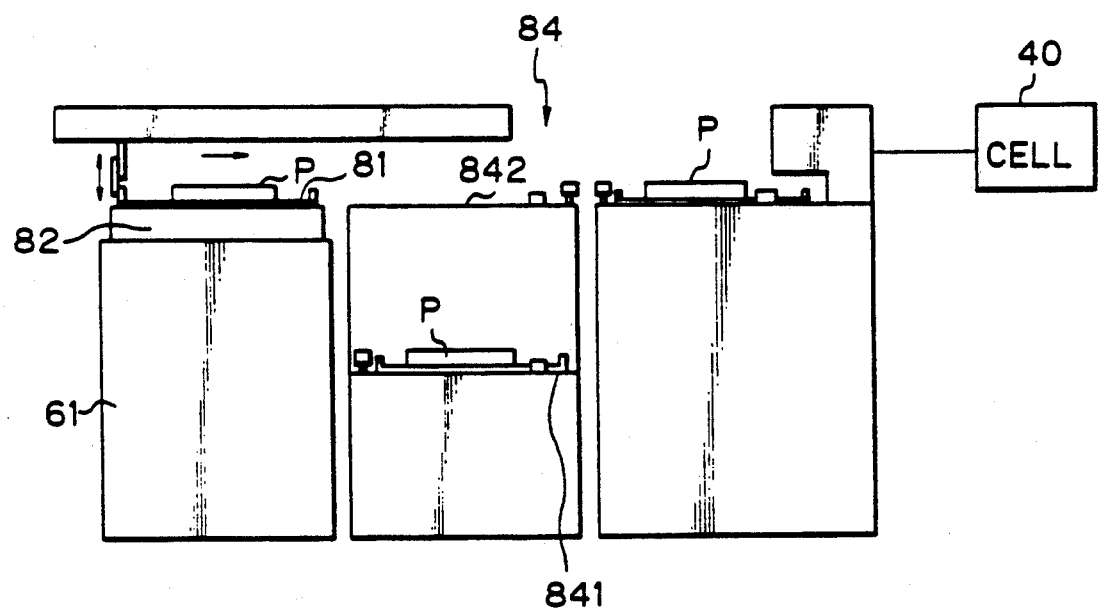
FIG. 12B is a side view for explaining the transfer machine.
Figure 12C:
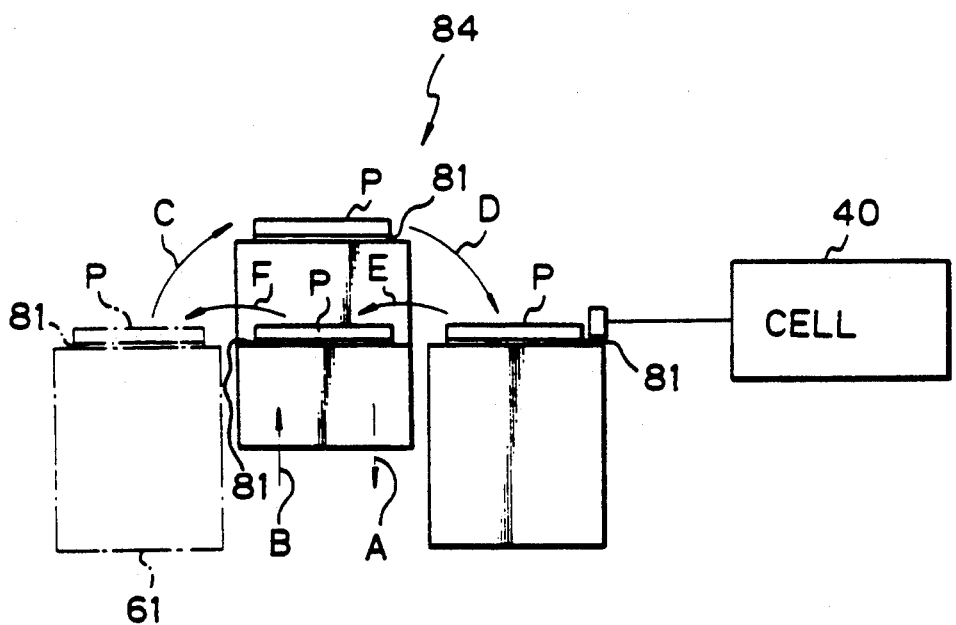
FIG. 12C is a side view showing a mode of the transfer machine.

FIG. 12A is a plan view for explaining a transfer machine. FIG. 12B is a side view for explaining the transfer machine. FIG. 12C is a side view showing a mode of the transfer machine.

In FIG. 12A, the two-way transfer machine 84 is placed between the transport line 61 and the cell 40, and the product P on the pallet is moved by the carrier belt 840 from the left to the right in the figure (or vice versa).

FIG. 12B is a side view of the constitution of FIG. 12A and shows that the two-way transfer machine 84 is made from a two-stage elevator. The first stage of the elevator is shown by 841 and the second stage by 842. The first stage carries the products P which have finished being tested, while the second stage receives products P to be tested from then on.

The feature of the two-way transfer machine 84 is that the flow of the unprocessed products P sent in from the carrier car 82 to the cell 40 and the flow of the processed products P sent from the cell 40 to the carrier car 82 are formed by alternately switching the first stage and second stage of the two-stage elevator so as to enable the products to be shifted in two directions. An illustration enabling this to be more easily understood is given in FIG. 12C, where the movement of the elevator is shown by the arrows A and B and the flows of the products P are shown by C, D, E, and F.

FIG. 13A and FIG. 13B are views showing the detailed constitution of a central processing system, where FIG. 13A shows the transport control side which deals directly with the CPU 10. This corresponds to FIG. 2. Further, FIG. 13B shows in detail the content of the group of tables 21 of FIG. 2. Note that BCR is a bar code reader.

Further, FIG. 14A to FIG. 14I are views showing details of the table 91 to 99 of FIG. 13B.

PCB Process Table 91 (FIG. 14A)

This table records the test equipment 40 by which the PCB's are to be tested for each type of PCB and has records for all types of PCB's tested by the transport system. Note that the test equipment numbers are not limited to the order of registration of the test equipment.

PCB Test Equipment Test Program Table 92 (FIG. 14B)

This table records which test program the PCB's are to use in units of test equipment used by the PCB's. Note that several test programs may be recorded for a single test item and that when preparing the transport and testing table. selection is made of one with a priority flag which is ON. This flag may be changed at any time from the outside.

Transport and Testing Table 93 (FIG. 14C)

This table is created by the CPU from the PCB process table 91 and the PCB test equipment TP table 92 when a PCB is entered to the transportation system and is made for each manufacturing number of the PCB's. The test equipment numbers are comprised of two parts giving the test programs used by the test equipment and the completion flag. The completion flag has an initial value of 0.

Untested Product Rotary Stock Shelf Unit Control Table 94 (FIG. 14D)

This table includes an empty shelf management table and stock table. The former table holds the shelf addresses of the rotary stock shelf unit and holds if the shelves are in use or not. The latter table holds the shelf numbers by the ID's of the PCB's existing in the revolving shelves. Further, it holds data as to which test equipment is used by the PCB of those ID's.

Untested Product Conveyor Management Table (FIG. 14E)

This table includes a number of tables equal to the untested product conveyors 31 and holds details of the ID's of the PCB's (products pushed out from racks) which are on the conveyor transfer machines 84 and can be transported. This is the same as the stock table of the untested product rotary stock shelf unit 32. Note that the number of pieces of data of the table 95 is equal to the number of the untested product conveyors 31.

Tested Product Rotary Stock Shelf Unit Management Table 96 (FIG. 14F)

This table is comprised of an empty shelf management table and a store table. The former table is the same as the table 94 of the untested product rotary stock shelf unit, while the latter store table has the store addresses for ID's of PCB's for which all tests have been completed.

Migratory Product Carrier Car No. Table 97 (FIG. 14G)

This table holds the carrier car number of carrier cars carrying tested products from the test equipment 40 when those tested products are migratory products (semifinished products) for entry into untested product rotary stock shelf unit 32. The carrier car numbers stored in the table 97 are used for processing when carrier cars are standing by for transport (explained later). A number of tables of this type are provided corresponding to the number of barrier cars carrying migratory products.

Transport Standby Data Table 98 (FIG. 14H)

This table temporarily stores transport command data prepared when i) an untested product request or ii) an untested product and discharge request are issued from a test equipment 40 and untested products which can be entered to the test equipment 40 exist in the untested product storage 30. The table 98 stores location information on where the linear carrier car stops in the "From-To-To" area. Nothing is entered for locations where stopping is not required. Further, when untested products are discharged from the rotary stock shelf unit 32, the table holds a flag to that effect (entered products from rotary stock shelf unit) and recognizes the stock-discharge state (if there is a transfer machine between the linear carrier car and the rotary stock shelf unit) or non-stock-discharge state. In other words, this is a stock-discharge status flag.

Further, when the transport command data is for transporting out tested products from the test equipment 40, it is checked if the transport PCB ID is for a migratory product.

On the other hand, when there is a discharged product request from the testing machine 40, the stopping position information and the state of migration of the discharged product are checked. Since only discharge is involved, the ID's of entered products PCB are not held.

Note that the transport pattern in FIG. 14H stores the addresses of the stopping stations (transfer machines 84) of the carrier cars.

Further, the above-mentioned stock-discharge status flag is used effectively when entering products from the untested product rotary stock shelf unit 32, with "0" indicating the noncompletion of stock-discharge and "1" indicating the completion of stock-discharge. Further, in the case of entry from the rotary stock shelf unit 32, it is "1", while in other cases, it is empty. Further, the "0" and "1" of the migratory product discharge flag (discharged product from the test equipment 40) indicate when there is no migratory product and when there is one, respectively.

Test Equipment Request Standby Table 99 (FIG. 14I)

This table stores the number of the test equipment 40 when i) an untested product request or ii) an untested product and discharge request are issued from the test equipment 40 and there is no PCB which can be entered to the test equipment 40 in the untested product conveyor management table 95 and the rotary stock shelf unit management table 94. When a new PCB ID is issued to these two tables, the testing machines standing by with requests are retrieved from this table 99 and the results are used for determining whether the products can be entered or not.

Note that the record areas of the table 99 correspond in number to the test equipment 40. Further, "0" and "1" of the untested product request flag indicate no untested product request and an untested product or untested product discharge request, respectively. Further, these are held together with the PCB ID's of the products discharged from the cells. When the untested product request flag is "1", it means that there is no product at the untested product storage 30.

Figure 15:
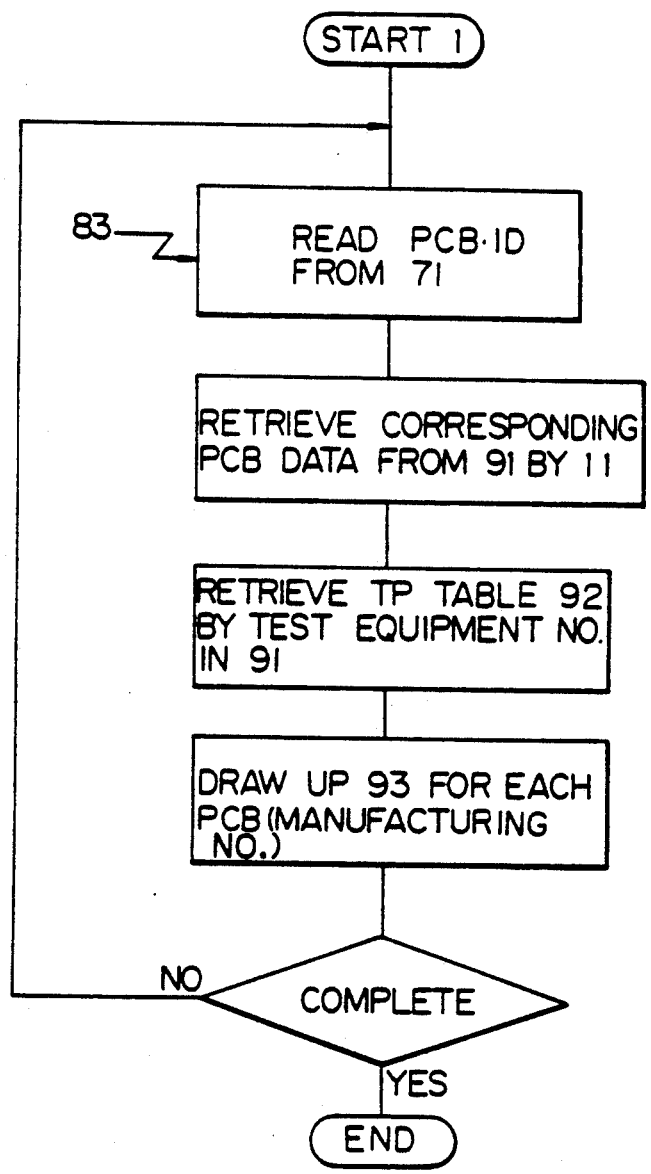
FIG. 15 is a flow chart showing processing for preparing a transport and testing table.
Figure 16A:
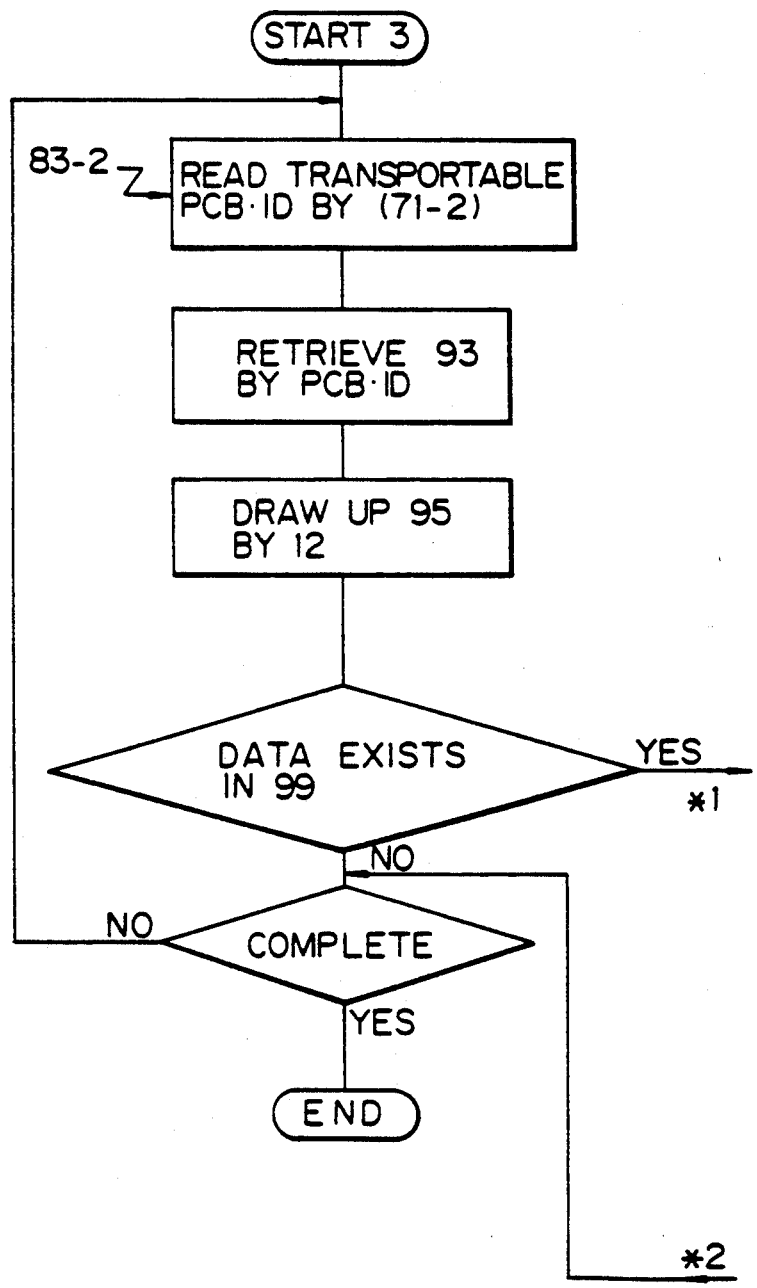
FIG. 16A and FIG. 16B are re flow charts showing processing for preparing an ,untested product conveyor management table.
Figure 16B:
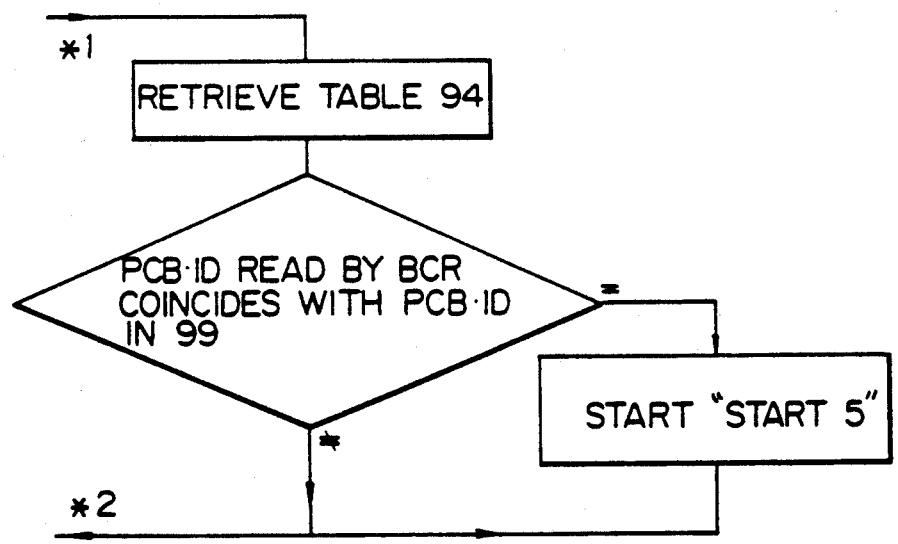
Figure 17A:
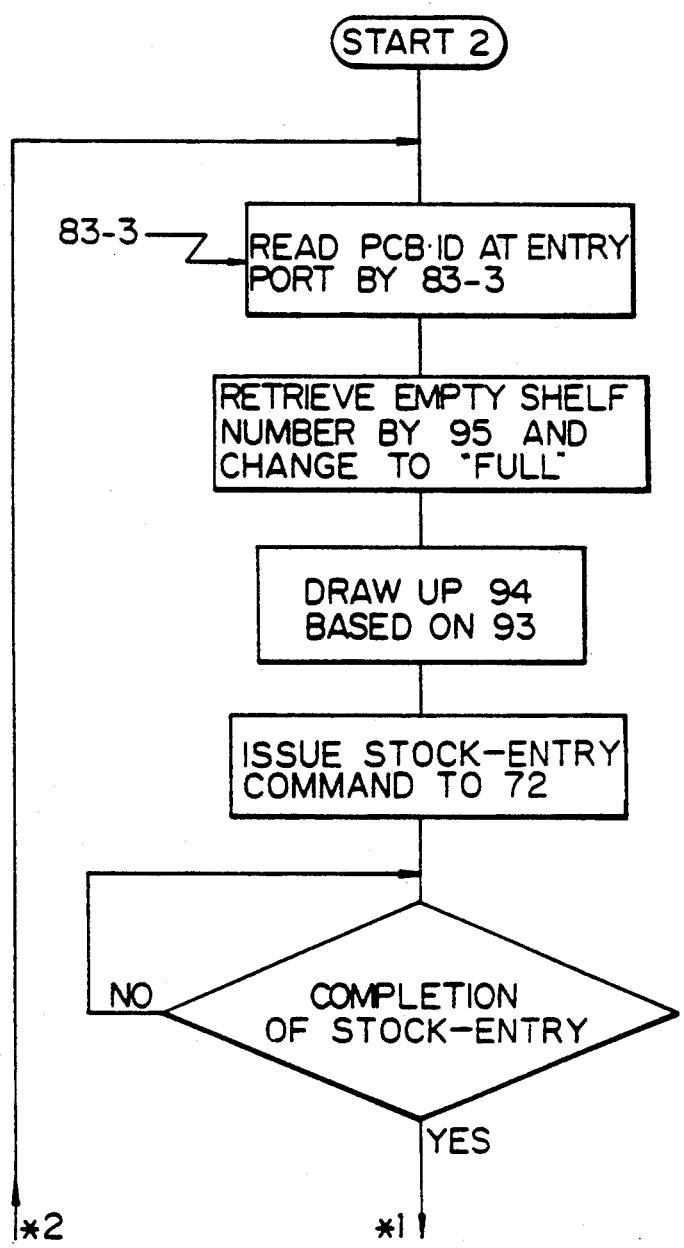
FIG. 17A and FIG. 17B are flow charts showing processing for preparing an untested product rotary stock shelf unit management table.
Figure 17B:
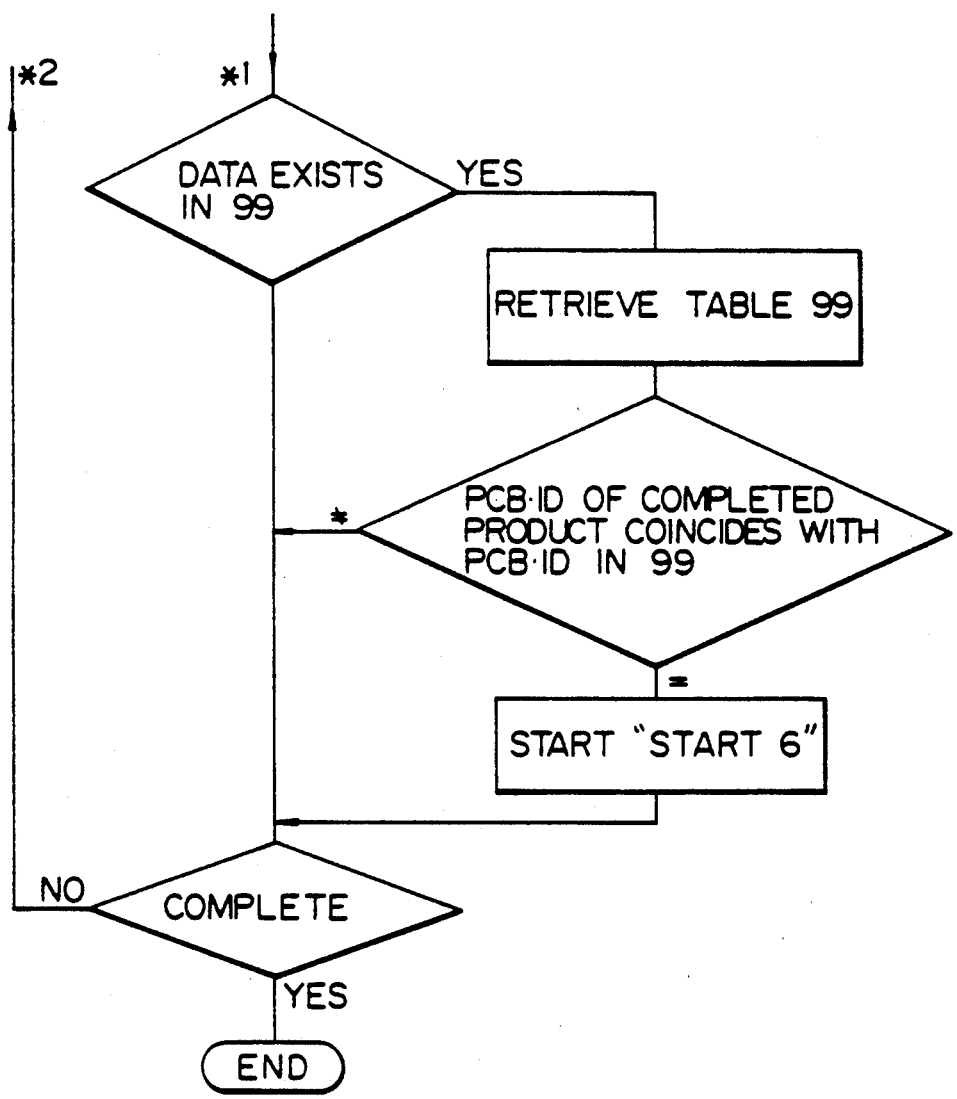
Figure 18:
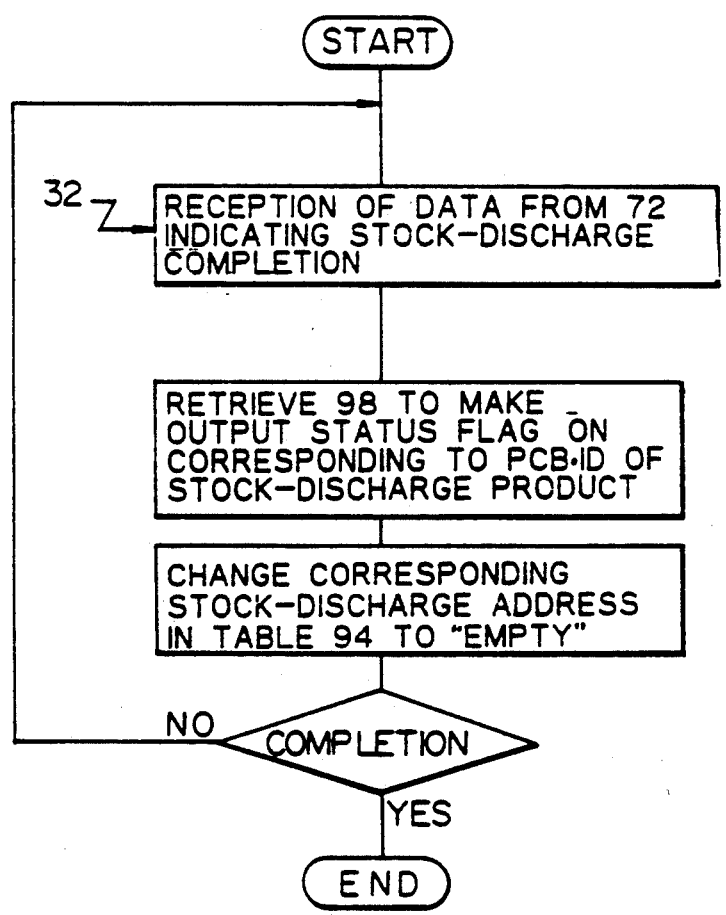
FIG. 18 is a flow chart showing the control of the transport line stock-discharge port of the untested product rotary stock shelf unit and the maintenance of the standby transport data table.
Figure 19A:
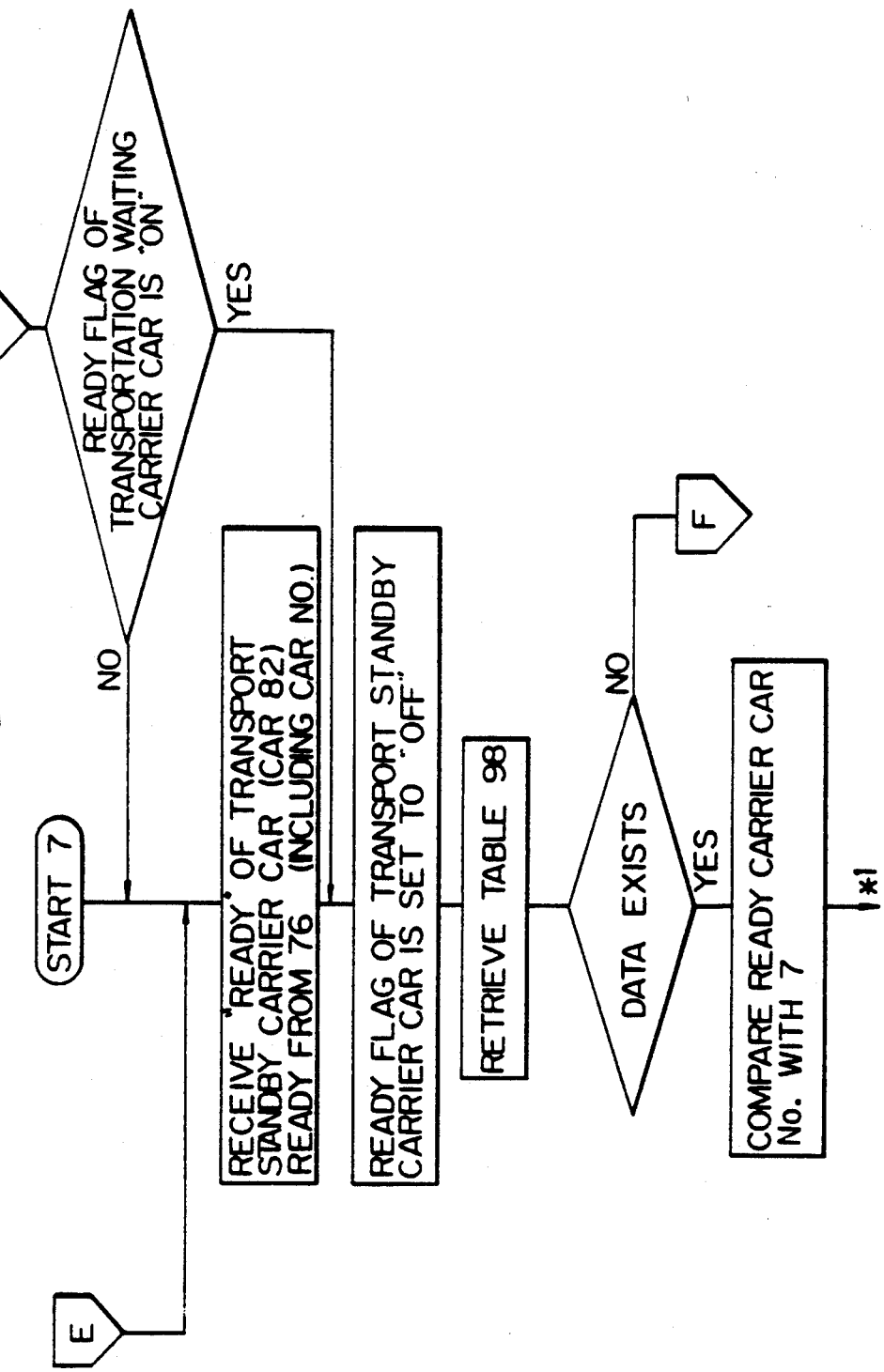
Figure 19B:
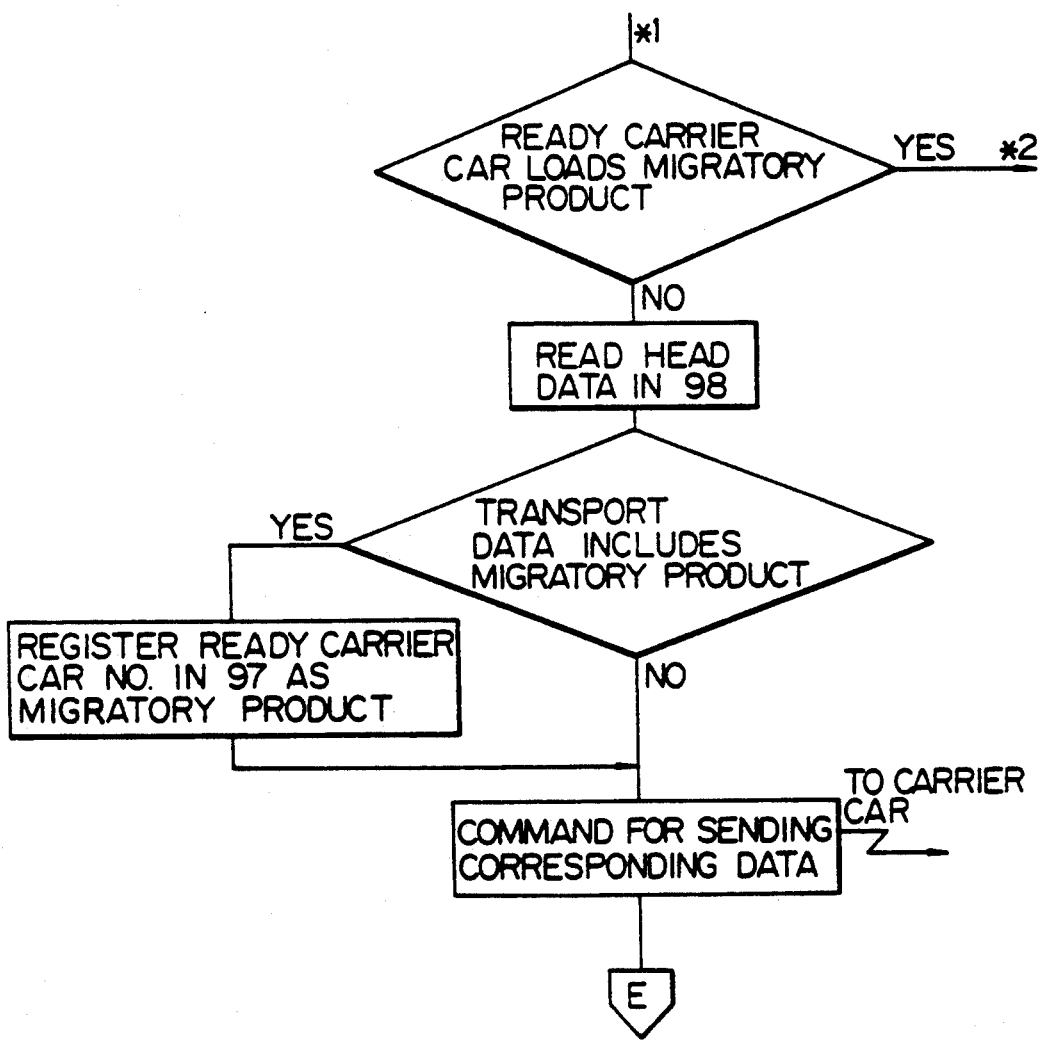
Figure 19D:
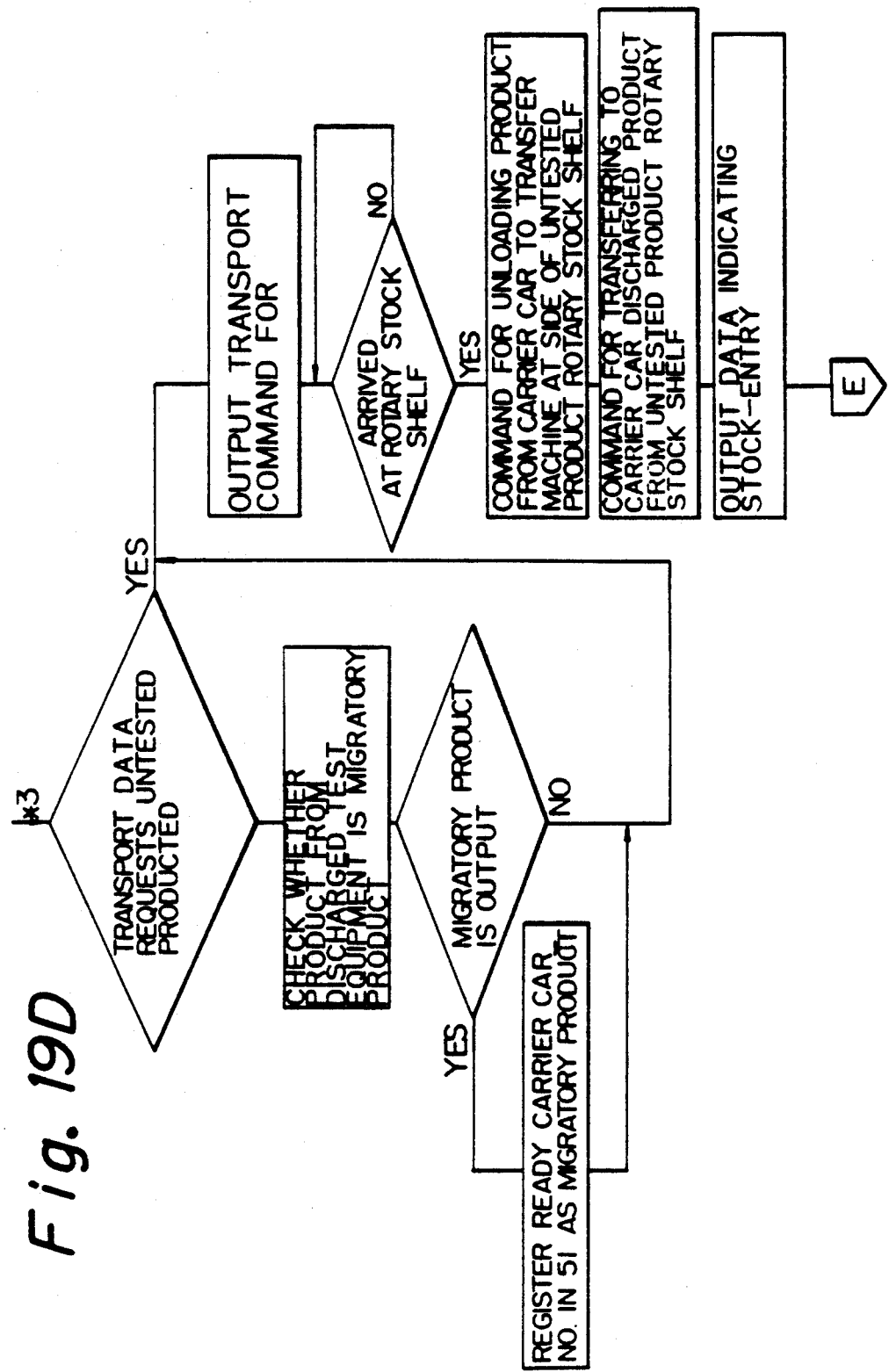
Figure 19E:
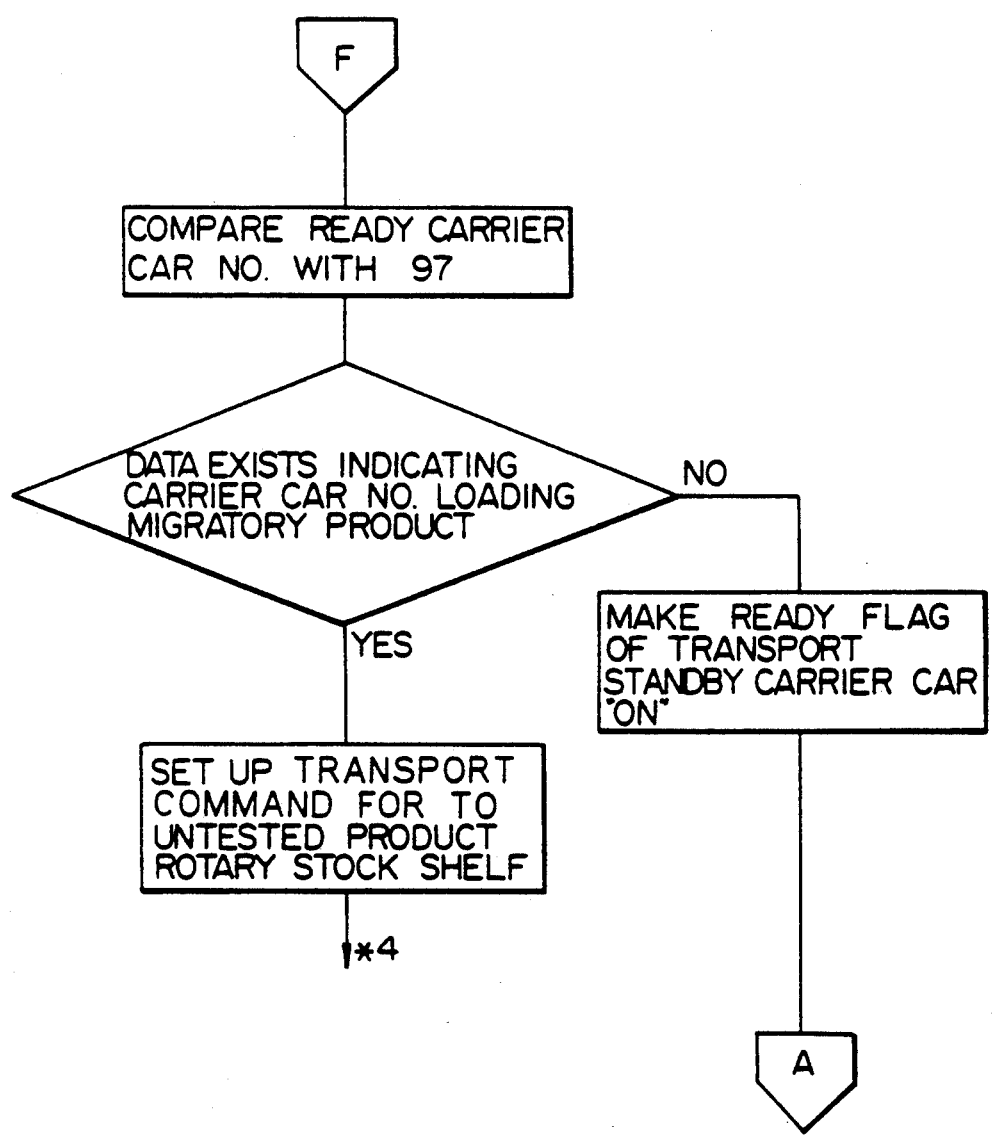
Figure 19F:
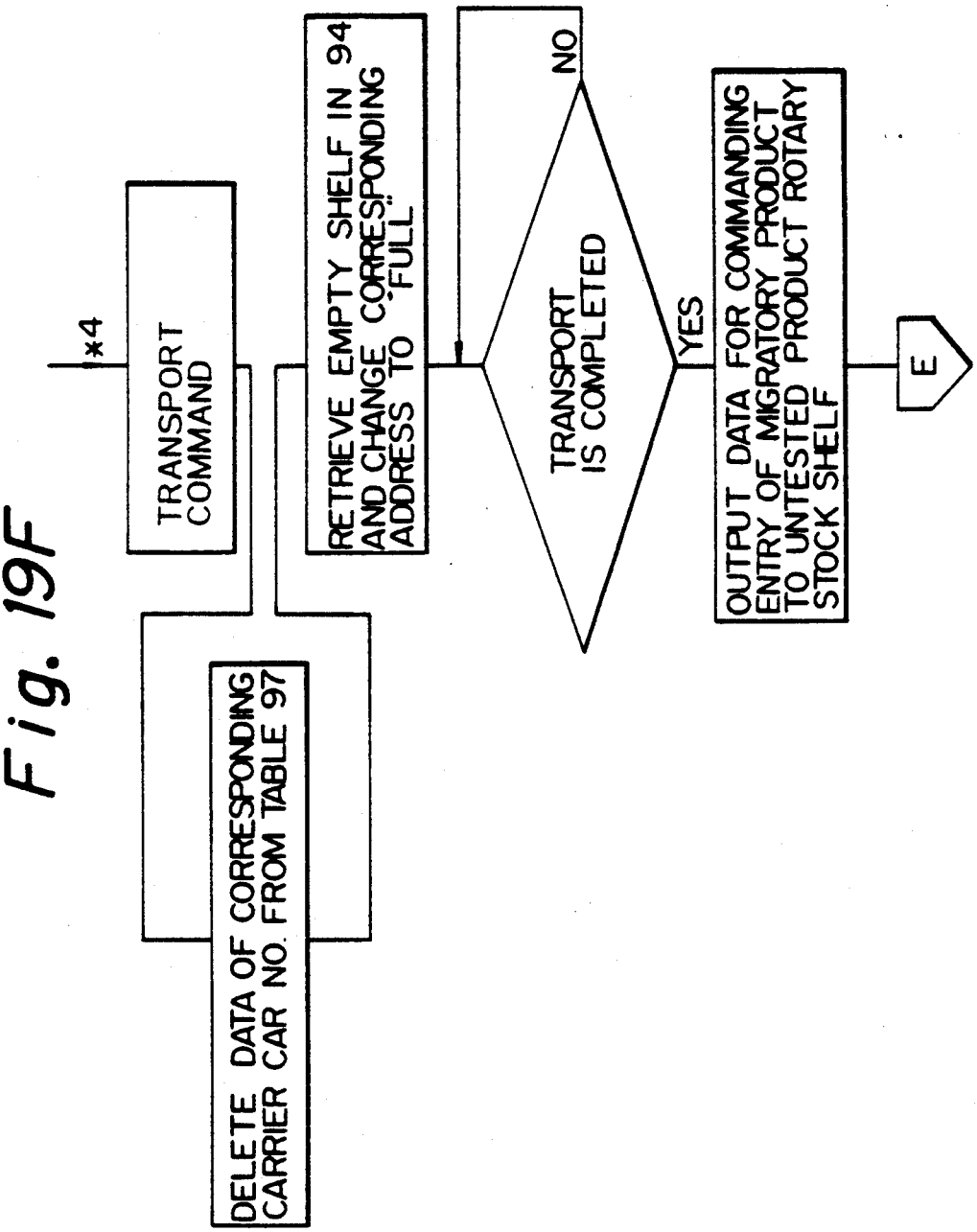
Figure 20A:
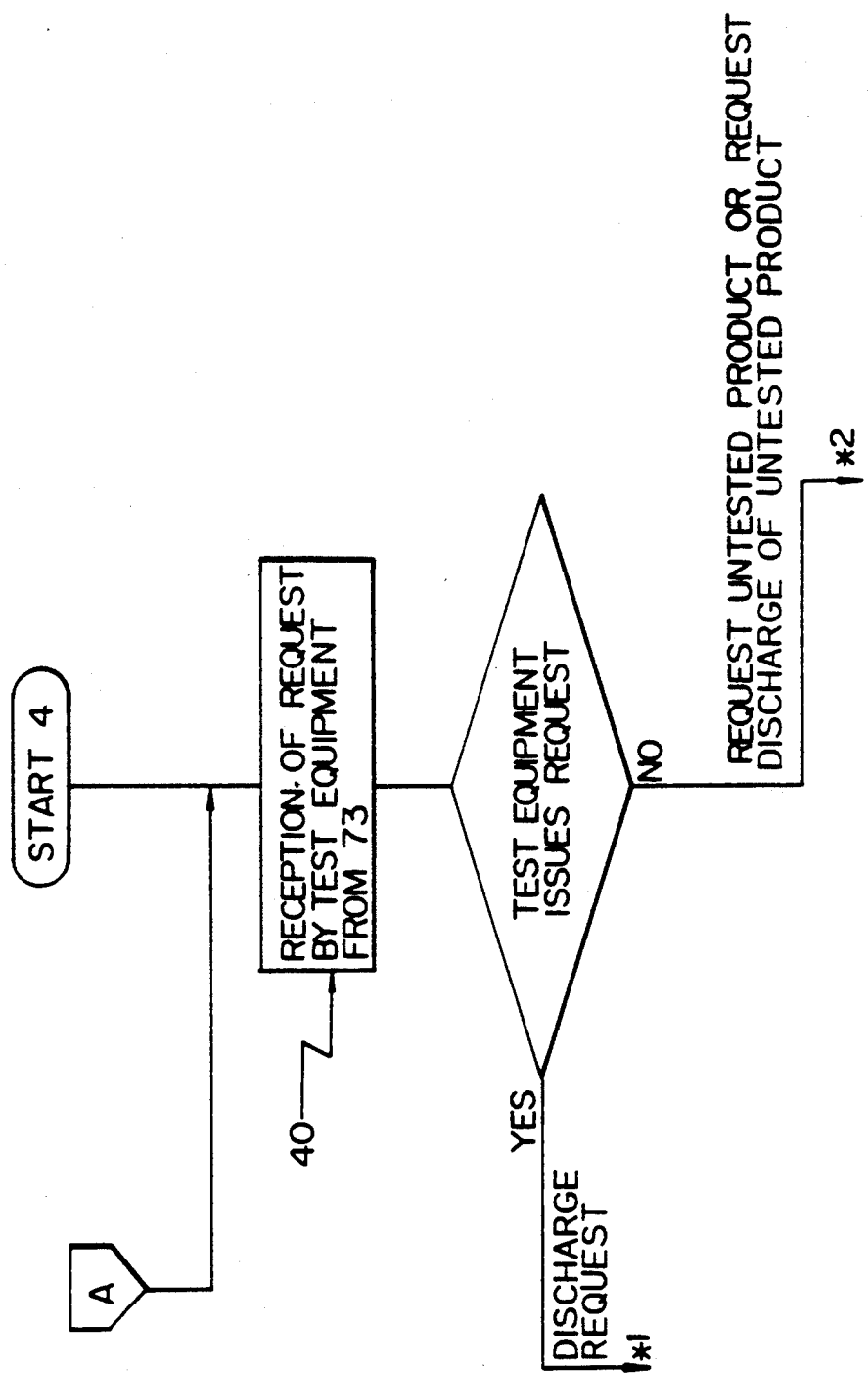
FIG. 20A, FIG. 20B, FIG. 20C, FIG. 20D, FIG. 20E, and FIG. 20E are flow charts showing control of transport and testing (demand for supply from test equipment)
Figure 20B:
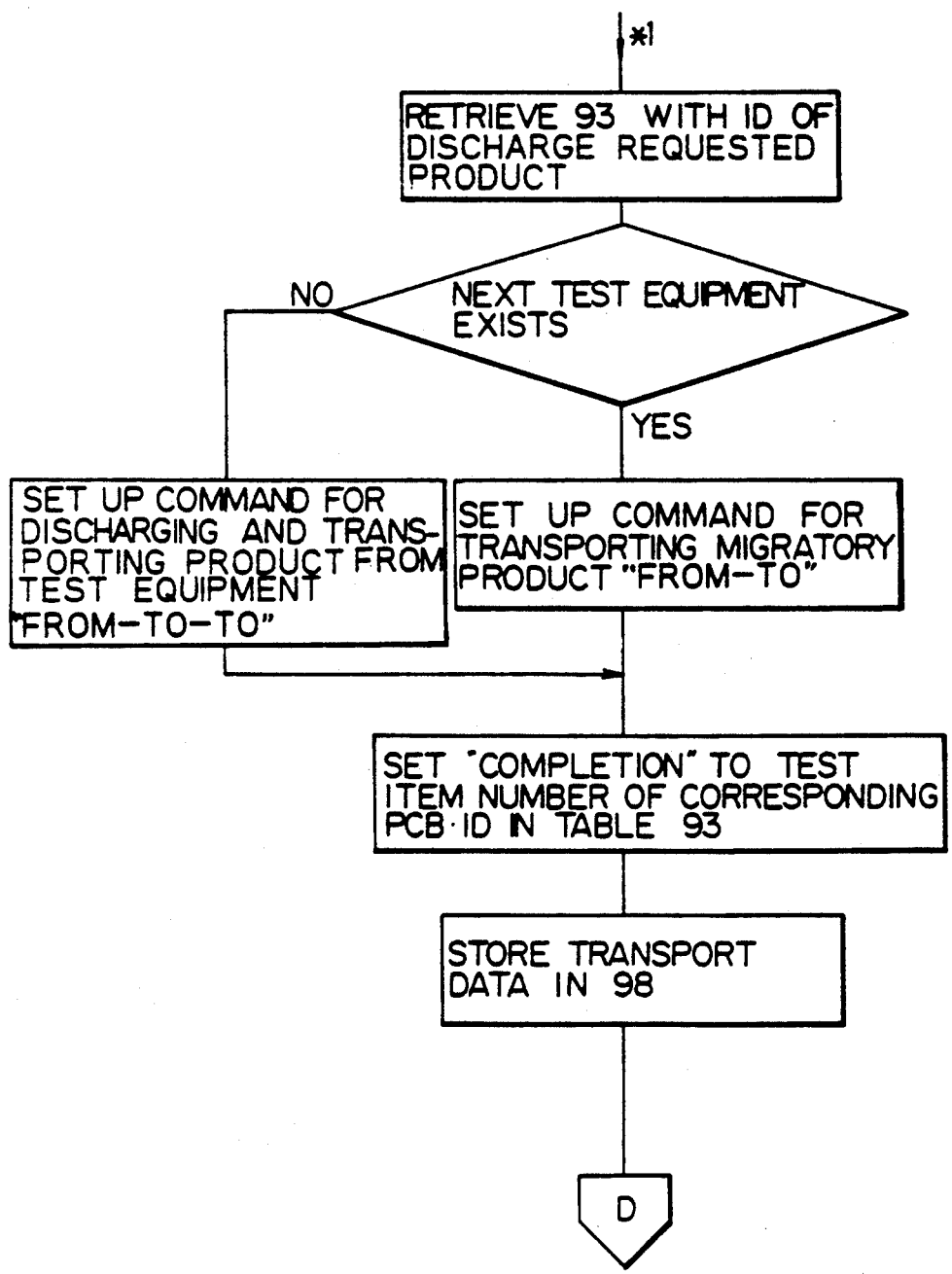
Figure 20E:
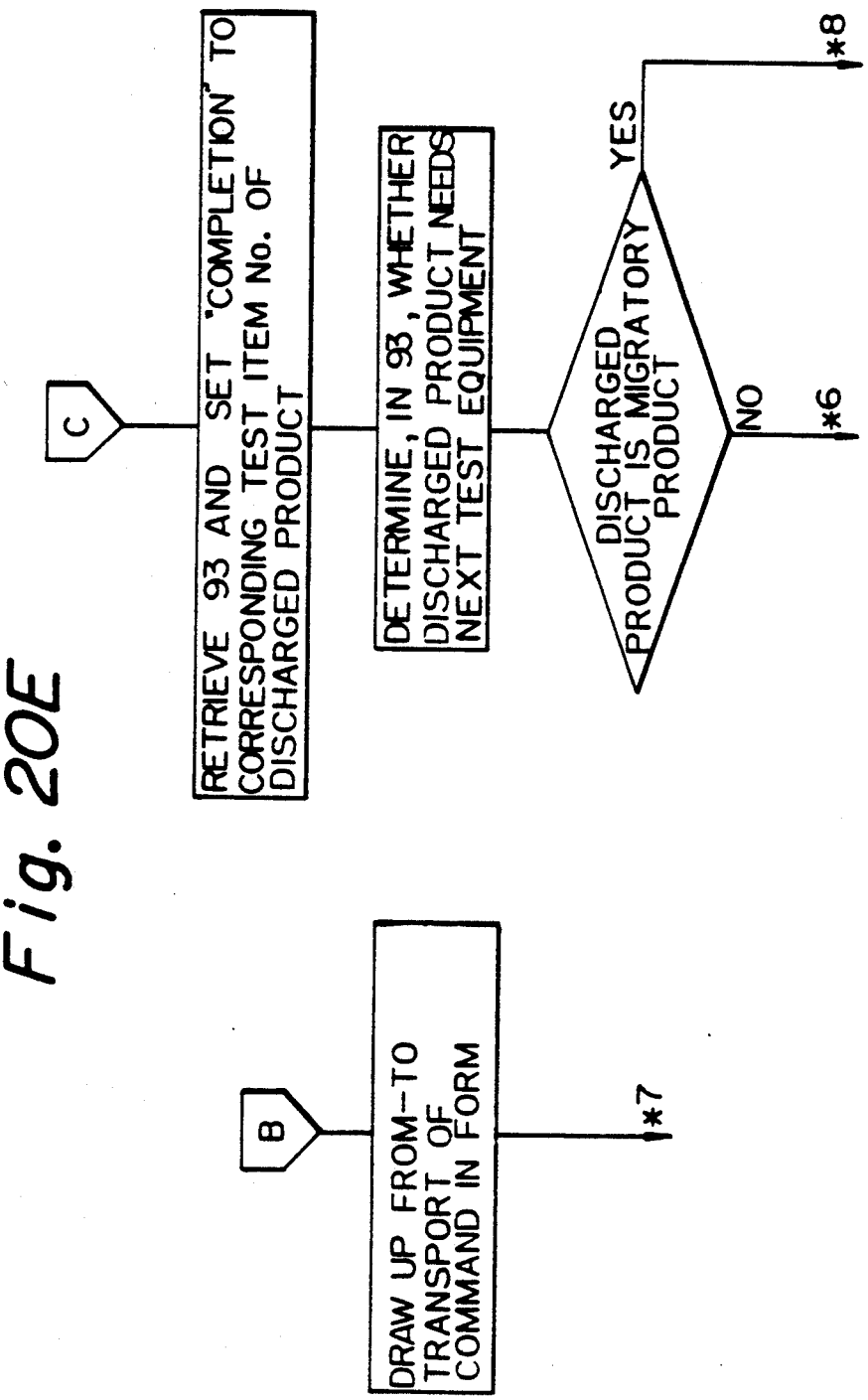
Figure 20F:
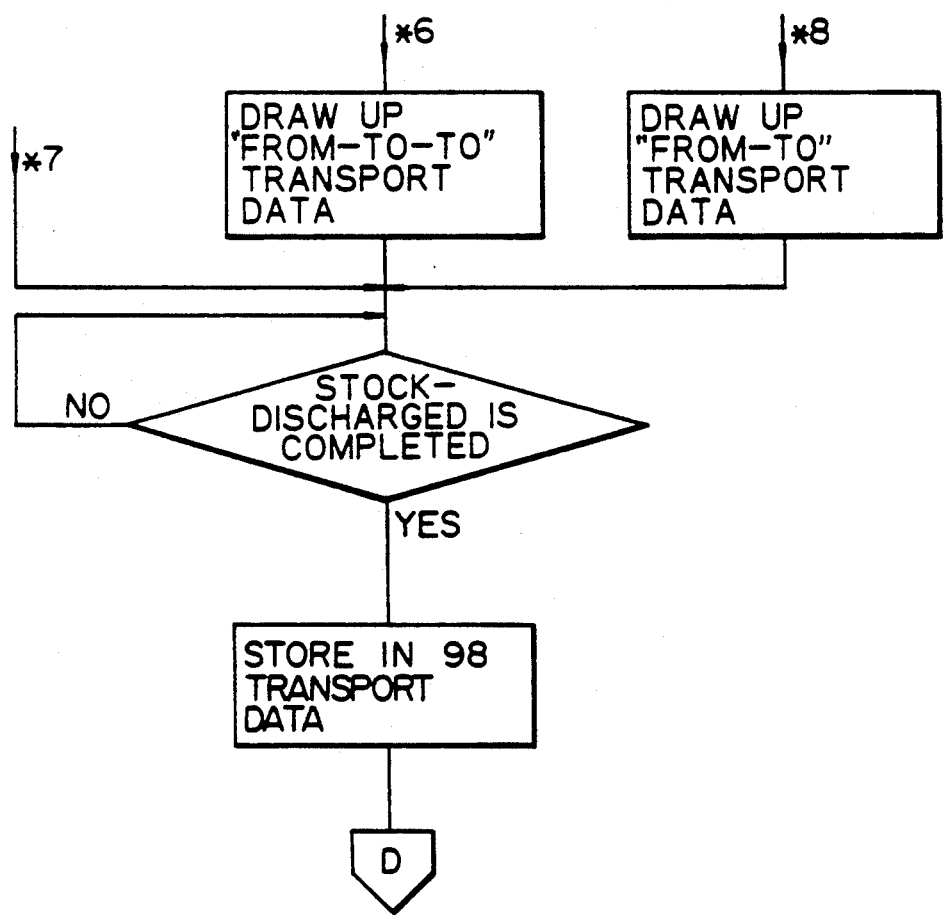
Figure 21A:
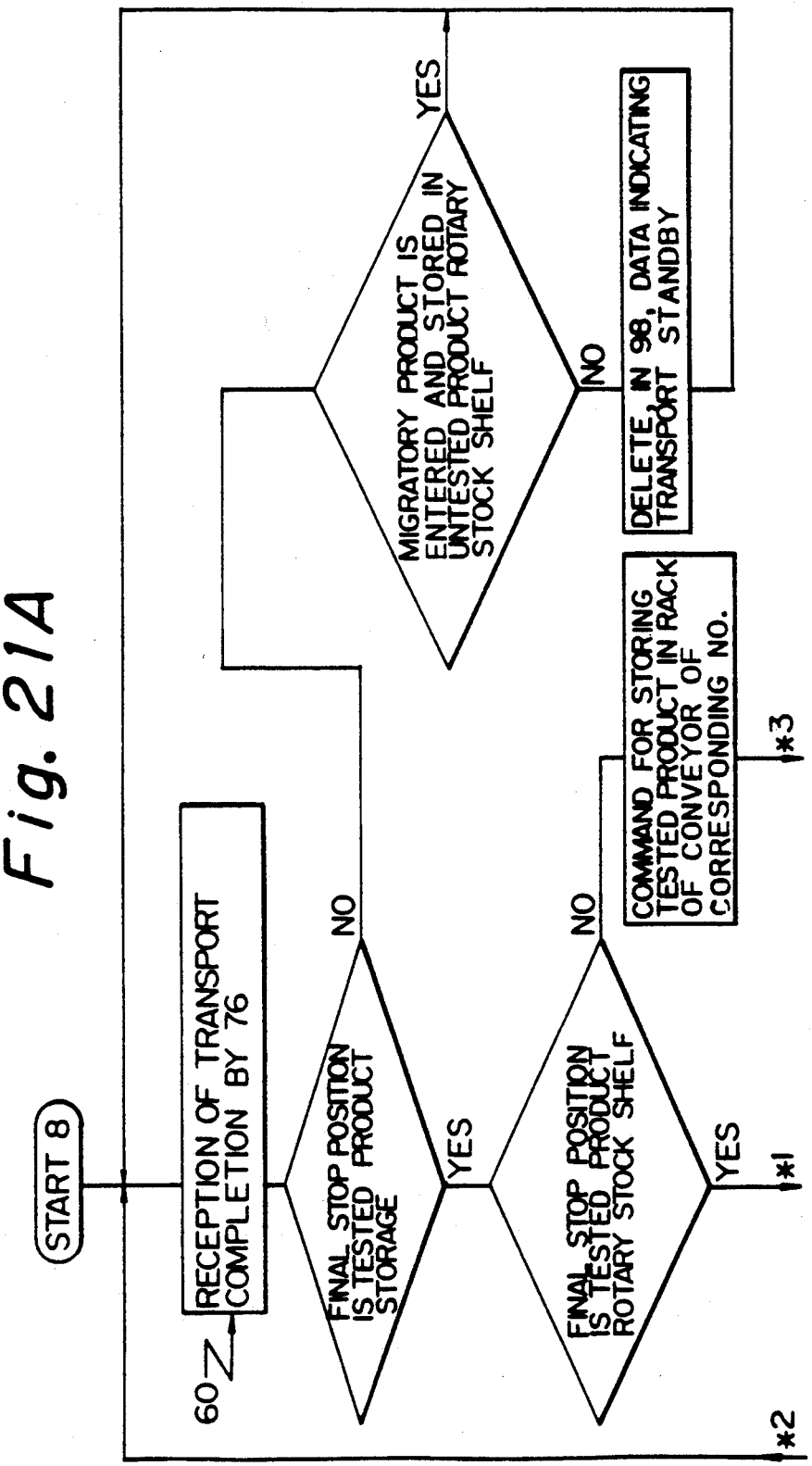
FIG. 21A and FIG. 21B are flow charts showing the processing of storage of tested products.
Figure 21B:
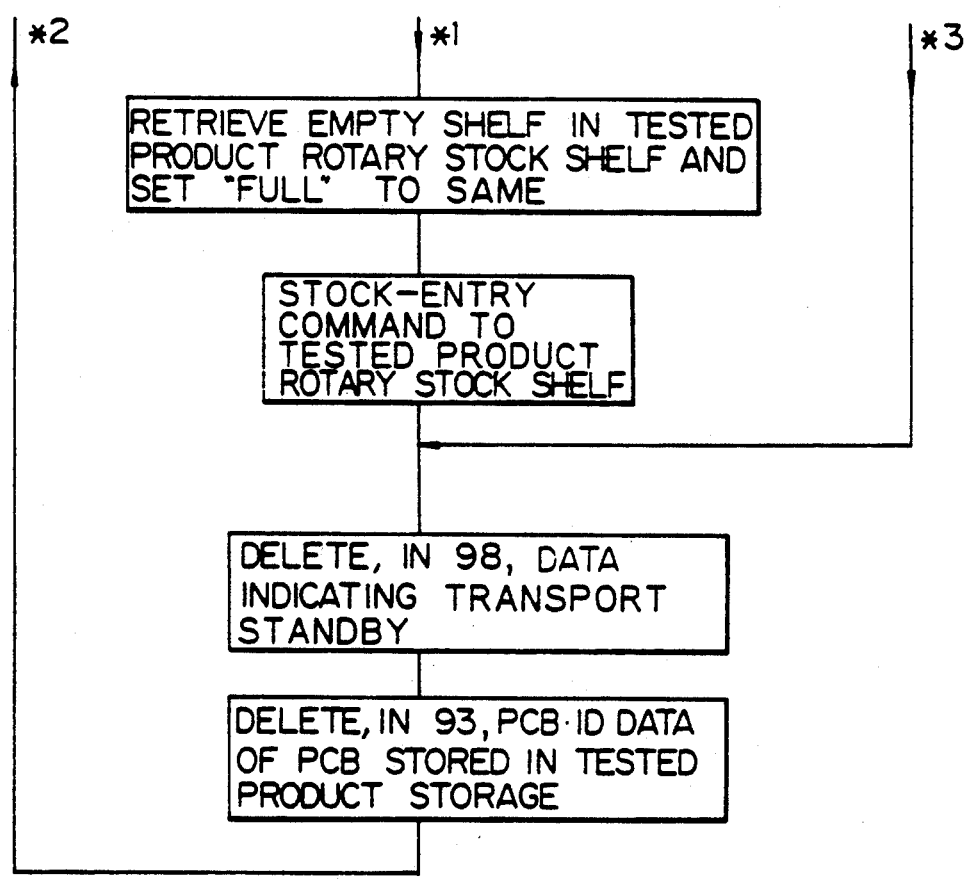

FIGS. 15 to 21 are flow charts showing the operations of main portions in the embodiment and are as follows:

FIG. 15: Flow chart showing processing for preparing a transport and testing table;

FIG. 16A and FIG. 16B: Flow charts showing processing for preparing an untested product conveyor management table;

FIG. 17A and FIG. 17B: Flow charts showing processing for preparing an untested product rotary stock shelf unit management table;

FIG. 18: Flow chart showing the control of the transport line stock-discharge port of the untested product rotary stock shelf unit and the maintenance of the standby transport data table;

FIG. 19A to FIG. 19F: Flow charts showing the control of transport and testing (standby transport);

FIG. 20A to FIG. 20F: Flow charts showing control of transport and testing (request for supply from testing machine); and FIG. 21A and FIG. 21B: Flow charts showing the processing of storage of tested products.

Below, an explanation will be made of FIG. 13A and FIG. 13B while referring to FIG. 14 and FIG. 15 to FIG. 21. Note that the reference numerals used in FIG. 15 to FIG. 21 and the following explanation are mainly the reference numerals used in FIG. 13A and FIG. 13B.

(1) Table 93 is prepared by retrieving, through tables 91 and 92 from the PCB, ID's obtained from the apparatus 71-1.

(2) For practical operation, products of diverse types for short run production are entered into the untested product rotary stock shelf unit 32.

The PCB ID obtained through the BCR 83-3 and apparatus 71-2 at this time is used by the processing unit 14 to search for an empty shelf using the table 94, and a stock-entry command is sent to the apparatus 72. At the same time, the table 94 is prepared by referring to the table 93 using the ID of the PCB entered into stock.

(3) Products of limited types for mass production are contained in racks and carried to the untested product conveyor 31. The PCB on the conveyor 31 in the transport unit 60 is moved to the cart (carrier car 82), then the succeeding PCB is moved automatically on the transfer machine 84 from the rack.

The PCB ID obtained through the BCR 83-2 and the apparatus 71-2 at this time is used by the processing unit 14 to search through the table 93 and prepare the table 95.

(4) In the event of the above (2) and (3), the table 99 is referred to and if the new PC ID is for a product which can be entered to the test equipment according to the table 99, the processing of the following i) and iii) of (5) is started.

(5) Based on the test equipment request notified from the apparatus 73, the processing unit 12 performs the following:

i) Upon Untested Product Request

The processing unit 12 retrieves the ID's of the PCB's which can be supplied to the test equipment of the number in question in order from the tables 95 and 94 and if there is such a product, writes a transport command in the table 98, retrieves the name of the test program from the table 92, and sends a test command through the processing unit 13 to the apparatus 73.

ii) Upon Discharge Request

The processing unit retrieves the PCB ID of the discharged product, indicates the test item is completed, then searches through the table 93 to determine if there is another test process for the discharged product.

When there is another test process, the processing unit turns the migratory product discharge flag to ON, prepares transport command data, and writes the same in the table 98 ("To").

When there isn't another test process, the processing unit prepares the transport command data to the tested product storage 50 and writes the same in the table 99 ("To-To").

iii) Upon Untested Product Discharge Request

When there is no untested product to be entered to the test equipment, the processing unit performs the same operation as with the above-mentioned i). When there an untested product, the processing unit performs the same operation as with the above-mentioned ii) to designate the test process as completed and at the same time check if the migratory product is a discharged product, prepares the transport command ("From-To-To" or "From-To"), and writes the same in the table 98. Further, it searches for the name of the test program of the untested product from the table 92 and sends the command through the processing unit 13 to the apparatus 73.

(6) The processing of the above-mentioned (ii) is performed using the information that the transport standby cart is ready, obtained from the apparatus 76, and the number of the cart.

Table 97 is searched to determine if the ready cart of the number in question is carrying a migratory product.

When the ready cart is not carrying a migratory product the table 98 is searched. If data exists there, the command instruction is output through the apparatus 76.

When the ready cart is carrying a migratory product the table 98 is searched. If no data exists there, the transport data to the untested product rotary stock shelf unit is prepared and sent to the apparatus 76. Further, the stock-entry address is found from the table 94 by the processing unit 14 and a stock-entry command is output to the apparatus 72.

If data exists, it is determined again from the table 98 whether the transport data indicates that the product is entered from he untested product rotary stock shelf unit 32 and is discharged from the stock.

If correct, the stock-entry and transport of the migratory product to the untested product rotary stock shelf unit 32 are combined with the main transport data and the two processed at once (by one machine).

If not, the above alternative processing is performed and the routine returns to the top of (6) without processing the transport data in the table 98.

(7) The tested product is put away. The processing of the processing unit 15 is performed based on the transport completion data obtained from the apparatus 76 whereby, when the final stopping position is the tested product rotary stock shelf unit 52 of the tested product storage 50, the table 96 is searched, the stock-entry address is prepared, the stock-entry command is sent to the apparatus 75, and the table 96 is prepared. Further, when the tested product conveyor 51 is the final stopping position, a rack storage command is output to the apparatus 74.

On the other hand, the processing unit 12 deletes the data of the table 98 based on the same transport completion data and when all the test items have been completed, deletes the said data from the table 93.

As explained above, according to the present invention, an efficient and, highly flexible transportation system be realized. As a result, i) it is possible to smoothly deal with urgent products, ii) management of the state of single products (including their locations) becomes possible, iii) efficient testing and manufacture with no apparent awareness of the transport time become possible, iv) defective products can be easily discharged without any special provision of a special conveyor and the details of the same can be managed, and v) when facilities (tested product conveyor etc.) break down, the facilities can be switched to alternative ones so as to avoid stopping the transportation system (line as a whole).

We claim:

1. A transportation system for processing products, comprising:

a transport unit of a circulating type;
a plurality of cells for processing the products;
an entry unit by which the products enter into said transport unit, said entry unit including—
 a rotary stock shelf unit for temporarily storing the products which must wait for processing by said cells which are busy; and
 belt conveyors disposed along said transport unit respectively storing groups of the products of corresponding types, the groups of the products being products of limited type for mass production; and
a discharge unit for discharging from said transport unit the products which have finished processing, at predetermined locations along said transport unit.

2. A transportation system for processing products, comprising:
a transport unit of a circulating type;
a plurality of cells for processing the products;
an entry unit by which the products enter into said transport unit, said entry unit including—
 entry first-in-first-out type storage means for storing the product for entrance to said transport unit; and
 entry random access type storage means for temporarily storing the products which must wait for processing by said cells which are busy; and
a discharge unit for discharging from said transport unit the product which have finished processing, at predetermined locations along said transport unit, said discharge unit including—
 discharge first-in-first-out type storage means for storing the product which have completed processing;
 discharge random access type storage means for storing the product which have completed processing; and
 means for selectively discharging the product to said discharge first-in-first-out and random access type storage means.

3. A transportation system as set forth in claim 2, wherein said discharge first-in-first-out type storage means in said discharge unit is a belt conveyor, and wherein said discharge random access type storage means is a rotary stock shelf unit.

4. A transportation system as set forth in claim 3, wherein said discharge first-in-first-out type storage means in said discharge unit are disposed along said transport unit and each store groups of the product of a corresponding type, the groups of the products being products of limited type for mass production which have finished processing.

5. A transportation system as set forth in claim 3, wherein the products which enter through said entry first-in-first-out type storage means in said entry unit are, after processing is finished, discharged through said discharge first-in-first-out type storage means in said discharge unit, and
wherein the products which enter through said entry random access type storage means in said entry unit are, after processing is finished, discharged through said discharge random access type storage means in said discharge unit.

6. A transportation system as set forth in claim 3, wherein said discharge random access type storage means in said discharge unit temporarily stores the products which are to be stored in said discharge first-in-first-out type storage means when said discharge first-in-first-out type storage means in said discharge unit is busy, until said discharge first-in-first-out type storage means is no longer busy.

7. A transportation system as set forth in claim 6, further comprising:
 one way transfer machines provided respectively between said transport unit, and said entry first-in-first-out type storage means in said entry unit and said discharge first-in-first-out type storage means in said discharge unit, and
 a two-way transfer machine provided between said transport unit and said discharge random access type storage means.

8. A transportation system comprising:
a transport unit of a circulating type;
an entry unit by which products are entered into said transport unit;
a plurality of cells for processing the products; a discharge unit for discharging from the transport unit the products which the cells have finished processing, disposed at predetermined locations along the transport unit;
said discharge unit including a FIFO type first storage means and a random access type second storage means;
said first storage means mainly discharging products of limited types for mass production; and
said second storage means mainly discharging products of diverse types for short run production.

9. A transportation system as set forth in claim 8, wherein said entry unit is comprised of an FIFO type first storage means and a random access type second storage means,
said plurality of cells are disposed along said transport unit,
said transport unit has carrier cars which travel around said transport unit, and
said carrier cars carry the products supplied from said entry unit to predetermined cells, and when the carrier cars become empty, the carrier cars run along the transport unit to return to the entry unit.

10. A transportation system as set forth in claim 9, wherein
when said products require processing at two or more of said cells, said carrier cars carry the products to a first cell of the cells,
when the first cell is a busy cell, the carrier cars return the products to said entry unit side and store them in said random access type second storage means,
when said busy cell becomes idle, the empty carrier cars carry the products stored in said second storage means to the cell which is not idle, and
the carrier cars which have carried the products to the now idle cell load the products which have been processed there and carry them to another cell or said discharge unit.

11. A transportation system as set forth in claim 10, wherein one way transfer machines are provided between said transport unit and said first storage means in said entry unit and said first and second storage means in said discharge unit, and
a two-way transfer machine is provided between said second storage means of said entry unit and said transport unit.

12. A transportation system as set forth in claim 11, wherein said two-way transfer machine comprises a two-stage elevator, and a flow of the unprocessed products sent in from the carrier car to the cell and the flow of the processed products sent from the cell to the carrier car are formed by alternately switching the first stage and second stage of the two-stage elevator to enable the products to be shifted in two directions.

13. A transportation system as set forth in claim 8, wherein said transport unit is comprised of a plurality of parallel connected branching transport units at portions provided along said cells.

14. A transportation system as set forth in claim 13, further comprising a direction changing means for guiding said carrier cars to said branching transport unit.

15. A transportation system, controlled by a CPU cooperating with a main memory and comprising:
   an entry unit for a plurality of products;
   a plurality of cells for processing the products after entry;
   a discharge unit for removing the products which predetermined cells have finished processing;
   a circulating transport unit for moving the products through said entry unit, said cells, and said discharge unit;
   said entry unit including—
      a first storage of a first-in-first-out type which receives the products independently in units for processing and receives mainly products of limited types for mass production; and
      a second storage of a random access type which receives mainly products of diverse types for short run production;
   said circulating transport unit including a circulating type transport line which returns semifinished products upon which processing by said cells has not yet been completed, to the second storage; and
   said CPU controlling the first and second storage to supply the products to any cell whenever there is a request for supply of the products from that cell.

16. A transportation system as set forth in claim 15, wherein said discharge unit includes a first-in-first-out type storage and a random access type storage, and wherein said transportation system further comprises:
   discrimination control means for individually discriminating the products which are received at said entry unit;
   entry side second storage control means for controlling entry and discharge of the products form the second storage;
   cell control means for controlling said cells;
   discharge side first storage control means for controlling the first-in-first-out type storage in said discharge unit;
   discharge side second storage control means for controlling the random access type storage in said discharge unit; and
   transport unit control means for controlling said circulating transport unit.

17. A transportation system as set forth in claim 16, wherein said CPU comprises:
   a transport and processing table preparation processing unit which transfers control information with said discrimination control means, entry side second storage control means, cell control means, discharge side first storage control means and discharge side second storage control means under control of said CPU,
   a transport command processing unit,
   a processing command processing unit,
   an entry side second storage control command processing unit, and
   a discharge unit control command processing unit;
   wherein said main memory is provided with groups of tables which successively update and manage status information of the products at said entry unit, said cells, said discharge unit, and said transport unit; and
   wherein said CPU controls transport of the products while referring to the groups of tables.

18. A transportation system for transporting and processing products, comprising:
   transport means for circularly transporting the products;
   entry means for storing the products in one of a first sequential storage and a first random access storage and entering the products into said transport means;
   processing means for processing the products; and
   discharge means for storing the products in one of a second sequential storage and a second random access storage and discharging the products from said transport means.

19. A transportation system according to claim 18, further comprising a central processing unit for controlling said transport means and said processing means to process the products, and for controlling said entry means to enter those of the products requested by said processing means.

20. A transportation system according to claim 19, wherein said processing means comprises processing cells performing various processing tasks upon the products, and said first random access storage stores those of the products designated by said central processing unit to be processed by the processing cells that are currently busy.

21. A transportation system according to claim 20, wherein said second random access storage stores those of the products designated by said central processing unit to be stored by said second sequential storage, while said second sequential is busy.

* * * * *